(12) United States Patent
Toyozumi et al.

(10) Patent No.: US 11,440,270 B2
(45) Date of Patent: Sep. 13, 2022

(54) CARBON FIBER REINFORCED RESIN PROCESSED PRODUCT HAVING END SURFACE AND METHOD OF MANUFACTURING THE SAME

(71) Applicant: Teijin Limited, Osaka (JP)

(72) Inventors: Takashi Toyozumi, Osaka (JP); Syuhei Suzuki, Osaka (JP)

(73) Assignee: Teijin Limited, Osaka (JP)

( * ) Notice: Subject to any disclaimer, the term of this patent is extended or adjusted under 35 U.S.C. 154(b) by 504 days.

(21) Appl. No.: 15/306,144

(22) PCT Filed: Apr. 23, 2015

(86) PCT No.: PCT/JP2015/062371
§ 371 (c)(1),
(2) Date: Oct. 24, 2016

(87) PCT Pub. No.: WO2015/163408
PCT Pub. Date: Oct. 29, 2015

(65) Prior Publication Data
US 2017/0106606 A1 Apr. 20, 2017

(30) Foreign Application Priority Data

Apr. 24, 2014 (JP) .............................. JP2014-090287
Apr. 24, 2014 (JP) .............................. JP2014-090288

(51) Int. Cl.
*B29C 70/14* (2006.01)
*B23C 5/10* (2006.01)
(Continued)

(52) U.S. Cl.
CPC ................ *B29C 70/14* (2013.01); *B23C 3/00* (2013.01); *B23C 5/10* (2013.01); *B29C 70/06* (2013.01);
(Continued)

(58) Field of Classification Search
CPC ............. B29C 70/14; B29C 70/06; C08J 5/04
See application file for complete search history.

(56) References Cited

U.S. PATENT DOCUMENTS 4,464,087 A * 8/1984 Muller ................ B23B 27/1629
407/113
7,431,538 B1 10/2008 Ni et al.
(Continued)

FOREIGN PATENT DOCUMENTS

| CH | 701414 A1 | 1/2011 |
|---|---|---|
| CN | 101657284 A | 2/2010 |

(Continued)

OTHER PUBLICATIONS

Jul. 21, 2015—(PCT/JP) Written Opinion—App 2015/062371—Eng Tran.

(Continued)

*Primary Examiner* — Laura A Auer
(74) *Attorney, Agent, or Firm* — Banner & Witcoff, Ltd.

(57) ABSTRACT

The present invention is aimed to provide a carbon fiber reinforced resin processed product which is almost free from the problems described above on a processed surface subjected to cutting or the like and has an end surface where generation of a burr is suppressed, has favorable surface properties, and surface nature, and particularly smoothness is excellent; and provides a carbon fiber reinforced resin processed product having an end surface which has fibers and a resin, wherein the end surface has a surface roughness (Rz) within a range from 5 μm to 50 μm.

8 Claims, 3 Drawing Sheets

(51) Int. Cl.
| | |
|---|---|
| *B23C 3/00* | (2006.01) |
| *B29C 70/06* | (2006.01) |
| *C08J 5/04* | (2006.01) |
| *B29C 70/42* | (2006.01) |
| *C08J 5/24* | (2006.01) |
| *B29K 101/12* | (2006.01) |
| *B29K 105/12* | (2006.01) |
| *B29K 307/04* | (2006.01) |

(52) U.S. Cl.
CPC .............. *B29C 70/42* (2013.01); *C08J 5/04* (2013.01); *C08J 5/042* (2013.01); *C08J 5/24* (2013.01); *B23C 2210/0442* (2013.01); *B23C 2210/0485* (2013.01); *B23C 2226/27* (2013.01); *B29K 2101/12* (2013.01); *B29K 2105/12* (2013.01); *B29K 2307/04* (2013.01); *C08J 2300/22* (2013.01); *C08J 2377/02* (2013.01); *Y10T 428/249945* (2015.04); *Y10T 428/31* (2015.01)

(56) References Cited

U.S. PATENT DOCUMENTS

| | | | |
|---|---|---|---|
| 2007/0065634 A1* | 3/2007 | Sauer ................. | C23C 18/1653 428/141 |
| 2007/0286955 A1 | 12/2007 | Kondo et al. | |
| 2007/0292669 A1 | 12/2007 | Yamasaki et al. | |
| 2008/0253846 A1 | 10/2008 | Ni et al. | |
| 2009/0185878 A1 | 7/2009 | Turrini | |
| 2011/0030940 A1* | 2/2011 | Takeda ................. | H01L 23/373 165/185 |
| 2012/0308782 A1 | 12/2012 | Yamasaki et al. | |
| 2014/0093682 A1* | 4/2014 | Nakamoto ............. | C08L 55/02 428/141 |
| 2014/0178631 A1 | 6/2014 | Taniguchi et al. | |
| 2014/0199515 A1* | 7/2014 | Oyabu ..................... | B32B 5/02 428/141 |
| 2015/0376353 A1* | 12/2015 | Takebe ................. | B29C 70/345 428/161 |

FOREIGN PATENT DOCUMENTS

| | | | |
|---|---|---|---|
| EP | 2082822 A1 | 7/2009 | |
| EP | 2633932 A1 | 9/2013 | |
| JP | H02-180516 A | 7/1990 | |
| JP | H03-079219 A | 4/1991 | |
| JP | H07-100979 A | 4/1995 | |
| JP | 2004-195890 A | 7/2004 | |
| JP | 2009-196015 A | 9/2009 | |
| JP | 2010-031612 A | 2/2010 | |
| JP | 2011-020248 A | 2/2011 | |
| JP | 2012-011409 A | 1/2012 | |
| JP | 2012-162647 A | 8/2012 | |
| JP | 2012-176471 A | 9/2012 | |
| JP | 2012-250341 A | 12/2012 | |
| WO | 2006-062038 A1 | 6/2006 | |
| WO | 2008-128035 A1 | 10/2008 | |
| WO | WO-2012169631 A1 * | 12/2012 | .............. C08L 55/02 |
| WO | 2013-031860 A1 | 3/2013 | |

OTHER PUBLICATIONS

Mar. 8, 2017—(EP) Supplementary Search Report—U.S. Appl. No. 15/783,718.
Nov. 6, 2018—(CN) Office Action—App 201580021371.0 and computer generated translation.
Jan. 12, 2017—(JP) Notice of Reasons of Revocation—App 2016-701007 (U.S. Pat. No. 5,908,188)—partial Eng tran.
Jan. 12, 2017—(JP) Concise Statement, list of references, and translation of patented claims—App 2016-701007 (U.S. Pat. No. 5,908,188).
Dec. 1, 2015—(JP) Office Action—App 2015545557—Eng Tran.
Nov. 10, 2015—(JP) Office Action—App 2015196944—Eng Tran.
Jan. 26, 2016—(JP) Office Action—App 2015196944—Eng Tran.
Jul. 21, 2015—International Search Report—Intl App PCT/JP2015/062371.
Sasahara "CFRP used on an Airplane", Fig. 17, vol. 54, No. 6, May 28, 2010, Kogyo Chosakai Publishing, Japan—Eng Tran.
Jun. 30, 2017—(JP) Decision of Objection—JP Patent 5908188B—App 2015-545557—Eng Tran.
Jan. 21, 2016—(JP) Office Action—App 2015-196944—Eng Tran.
Sasahara, "CFRP used on an Airplane," vol. 54, No. 6, pp. 10-16, May 28, 2010, Kogyo Chosakai Publishing, Japan—See Jan. 21, 2016—(JP) Office Action—App 2015-196944—Eng Tran.
Conversion Chart of Surface Roughness Codes: Ra, Rz, Rmax (Rzjis), Comprehensive Information Website of Grind Stone and Grinding/Polishing—Jun. 30, 2017—(JP) Decision of Objection—JP Patent 5908188B—App 2015-545557—Eng Tran.
Handbook of Chemistry, 5th Ed., Basic Section I. First p. 716, The Chemical Society of Japan, published by Maruzen Co., Ltd., Feb. 20, 2004-Jun. 30, 2017—(JP) Decision of Objection—JP Patent 5908188B—App 2015-545557—Eng Tran.
Research of Next Generation Basic Processing Technology for Manufacturing, Edit Data Collection, pp. 41-51—See Jun. 30, 2017—(JP) Decision of Objection—JP Patent 5908188B—App 2015-545557—Eng Tran.

\* cited by examiner

CARBON FIBER REINFORCED RESIN PROCESSED PRODUCT HAVING END SURFACE AND METHOD OF MANUFACTURING THE SAME

CROSS REFERENCE TO RELATED APPLICATIONS

This is a U.S. National Phase Application under 35 U.S.C. § 371 of International Application No. PCT/JP2015/062371, filed Apr. 23, 2015, which claims priority to Japanese Application Nos. 2014-090287, filed Apr. 24, 2014, and 2014-090288, filed Apr. 24, 2014, the entire contents of each of which are incorporated herein by reference.

TECHNICAL FIELD

The present invention relates to a carbon fiber reinforced resin processed product. Specifically, the present invention relates to a carbon fiber reinforced resin processed product containing carbon fibers and a resin and having a favorable end surface, and particularly relates to a carbon fiber reinforced resin processed product of a carbon fiber reinforced resin shaped product containing carbon fibers and a resin obtained by using an end mill, and a method of manufacturing the same.

BACKGROUND ART

Regarding a carbon fiber reinforced resin shaped product obtained by using a carbon fiber resin composite material (hereinafter, may be referred to as a composite material) in which carbon fibers are contained in a matrix resin, the carbon fiber reinforced resin shaped product is expected to be applied and utilized for automobiles required to be reduced in weight, due to its high specific strength and specific rigidity. Particularly, in a case where a matrix is formed from a thermoplastic resin, the carbon fiber reinforced resin shaped product is promising from the viewpoint of productivity and recyclability.

When considering a product which can be obtained by molding the composite material, in use of not only automobiles but also electronic equipments and the like, in order to obtain a product having a desired size and a desired shape, there is a need to perform processing such as removing and cutting an end portion (burr) of a carbon fiber reinforced resin shaped product obtained through injection molding, extrusion molding, or the like. Since the carbon fiber reinforced resin shaped product includes the carbon fibers, strength and rigidity are high. It is difficult to perform processing such as cutting, cutting-off, and the like by using a machine, and cutting tools are quickly abraded. Accordingly, the life expectancy thereof becomes short. In addition, the carbon fibers remain on a cut surface in a fluffy state, and there are many cases where a crack or separation (delamination) occurs on the front surface or the rear surface of a cut edge portion due to vibration during the processing (for example, refer to PTL 1).

PTL 2 discloses that a jigsaw having a particular number of blades or a particular blade height is used so as to polish and cut a carbon fiber reinforced plastic material having a thickness of 6 mm by using a blade in which diamond abrasive grains are electrodeposited.

As a method of cutting a carbon fiber resin composite material performed through the above-described mechanical processing, there are known methods in which a laser or water jet (WJ) is used. The cutting processing performed through any one of both methods has an advantage in that the processing can be applied to a workpiece in a non-contact manner. However, in a case where a laser is used, since a cutting portion and its surroundings of the composite material melt due to heat, processing precision may be deteriorated, and layers of the composite material may be separated from each other. In such a case, in order to enhance the quality, an additional step such as removing a heat affected portion is required (for example, refer to PTL 3). In addition, it has been mentioned that there is a problem in the cutting processing performed through the latter method in regard to the points of processing precision and productivity (for example, refer to PTL 4).

In addition, recently, in accordance with expansion of the field in which fiber reinforced resin molding bodies are utilized, the necessity advances in for various types of processing technologies and improvement of processing efficiency has arisen. Particularly, in order to reduce a burr or a fluff of fibers unavoidably generated on an end surface of a punched portion at the time of subjecting simple round hole punching processing to a fiber reinforced resin shaped product, a case where the burr or the fluffy state of fibers is suppressed from being generated while round hole punching processing is performed by using an end mill has been reported (for example, PTL 5). In addition, as a scope to be able to effectively prevent generation of the burr or the gauge at the time of cutting is performed by using an end mill, a method of cutting processing in which a helix angle is adjusted has been proposed (for example, PTL 6).

CITATION LIST

Patent Literature

[PTL 1] JP-A-2008-12920
[PTL 2] JP-A-3-79219
[PTL 3] JP-A-2012-11409
[PTL 4] JP-A-2012-250341
[PTL 5] JP-A-2009-196015
[PTL 6] JP-A-2-180516

SUMMARY OF INVENTION

Technical Problem

However, in a case where a carbon fiber reinforced resin shaped product is cut by using the end mill disclosed in PTL 5 and PTL 6, a burr is generated, and thus, it is difficult to obtain a favorable cutting processed product. Particularly, in a carbon fiber reinforced resin shaped product in which carbon fibers are aligned in one direction or are randomly oriented in an in-plane direction, tensile strength in a surface direction is high, and tensile strength in a direction perpendicular to the surface direction is low. Therefore, in a case where cutting processing force is acting in the direction perpendicular to the surface direction, generation of a burr or separation is likely to occur.

An object of the present invention is to provide a carbon fiber reinforced resin processed product which is almost free from the problems described above on a processed surface subjected to cutting or the like and has an end surface where generation of a burr is suppressed, has favorable surface properties, and surface nature, and particularly smoothness is excellent.

In the present invention, the term "cutting" denotes processing in which a certain object is divided into two or more smaller objects by using cutlery or the like. The term also includes processing in which a surface of an object is thinly peeled by cutlery or the like and processing in which unevenness is provided on a surface of an object by cutlery or the like.

Solution to Problem

The present invention is configured to be as follows.
[1] A carbon fiber reinforced resin processed product having an end surface,
which has fibers and a resin.
wherein the end surface has a surface roughness (Rz) within a range from 5 µm to 50 µm.
[2] The carbon fiber reinforced resin processed product having an end surface described in [1],
wherein the end surface is a cutting processed surface.
[3] The carbon fiber reinforced resin processed product having an end surface described in [2],
wherein the cutting processed surface is a cut surface.
[4] The carbon fiber reinforced resin processed product having an end surface described in any one of [1] to [3],
wherein the resin is a thermoplastic resin.
[5] The carbon fiber reinforced resin processed product having an end surface described in any one of [1] to [4],
wherein the carbon fibers include fibers having an average fiber length of 1 mm or more.
[6] The carbon fiber reinforced resin processed product having an end surface described in any one of [1] to [5],
wherein the carbon fibers include discontinuous fibers having an average fiber length within a range from 1 mm to 100 mm.
[7] The carbon fiber reinforced resin processed product having an end surface described in any one of [1] to [6],
wherein the carbon fibers are aligned in one direction or are randomly oriented in a two-dimensional direction in the carbon fiber reinforced resin processed product.
[8] The carbon fiber reinforced resin processed product having an end surface described in any one of [1] to [7],
wherein the carbon fibers are randomly oriented in the two-dimensional direction in the carbon fiber reinforced resin processed product.
[9] The carbon fiber reinforced resin processed product having an end surface described in any one of [1] to [8],
wherein the end surface has a height of 30 mm or less.
[10] The carbon fiber reinforced resin processed product having an end surface described in any one of [1] to [9],
wherein the carbon fibers included in the carbon fiber reinforced resin processed product has a volume fraction (Vf) of 55% by volume or less.
[11] The carbon fiber reinforced resin processed product having an end surface described in any one of [1] to [10],
wherein the end surface has no irregularly shaped portion.
[12] A method of manufacturing the carbon fiber reinforced resin processed product having an end surface described in any one of [2] to [11], comprising:
a step of cutting a carbon fiber reinforced resin shaped product which contains carbon fibers and a resin to provide an end surface by using an end mill,
wherein the end mill has a spiral cutting blade formed, on a side surface of a columnar rod member, from one end portion along an axis line in a longitudinal direction, and
the spiral cutting blade has a helix angle of from greater than 0° to 25° or less.
[13] The method of manufacturing a carbon fiber reinforced resin processed product described in [12],
wherein the end mill has a rake angle of from greater than 8° to less than 15°.
[14] The method of manufacturing a carbon fiber reinforced resin processed product described in [12] or [13],
wherein the end mill has a helix angle of from greater than 0° to less than 18°.

Advantageous Effects of Invention

In the carbon fiber reinforced resin processed product having an end surface according to the present invention (hereinafter, there may be a case of being abbreviated to a CFRP processed product), surface nature (particularly, smoothness) of the surface of the end surface is favorable, and generation of a crack or separation on the end surface and the surroundings of the carbon fiber reinforced resin processed product is suppressed. Moreover, a melting burr of a resin on the end surface is unlikely to be generated, and adhesive materials resulting from such as cutting chips of the carbon fibers and the resin are very few, and thus, handleability is also excellent. In this manner, in the carbon fiber reinforced resin processed product having an end surface according to the present invention, surface properties of the end surface are remarkably favorable. In addition, according to the present invention, an effort to perform a step of removing burrs or to perform polishing again can be omitted. Moreover, the man-hours of additional work can be reduced. Therefore, it is possible to obtain a carbon fiber reinforced resin processed product having an end surface of which productivity is excellent. The term "the end surface and the surroundings" denote flat surface portions (front and rear surface (flat surface) portions of a cut edge portion) nearby the end surfaces on both the surface (the flat surface) portions of the carbon fiber reinforced resin processed product corresponding to the direction perpendicular to the end surface of the carbon fiber reinforced resin processed product.

As described above, in the carbon fiber reinforced resin processed product having an end surface according to the present invention, the surface properties of the end surface are remarkably favorable. Accordingly, no additional work is necessary. Therefore, the product can be a final product as it is.

In addition, in the method of manufacturing a carbon fiber reinforced resin processed product according to the present invention, it is possible to obtain the carbon fiber reinforced resin processed product in which the burr or separation is prevented from being generated on a cutting surface. In addition, a post-treatment step for a cutting surface of the carbon fiber reinforced resin shaped product performed after the cutting processing can be reduced. Thus, the cost can be reduced.

DESCRIPTION OF EMBODIMENT

Figure 1A:
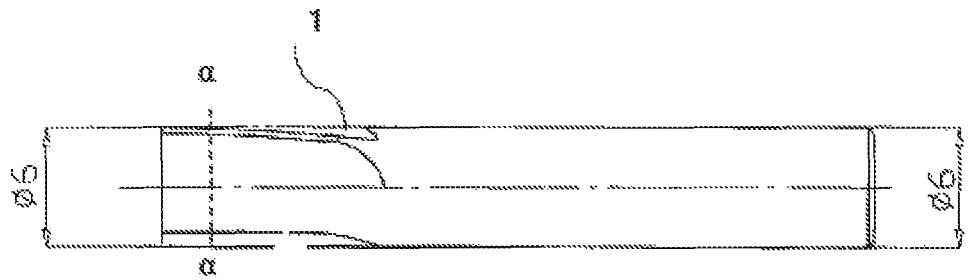
FIG. 1A is a schematic view schematically illustrating a side surface of an end mill (having four blades), in one embodiment of the present invention.

A carbon fiber reinforced resin processed product according to the present invention is a carbon fiber reinforced resin processed product which contains carbon fibers and a resin and has an end surface. Surface roughness (Rz) of the end surface is within a range from 5 µm to 50 µm.

The carbon fiber reinforced resin processed product according to the present invention may be referred to as "a carbon fiber reinforced resin processed product having an end surface with particular surface roughness", "a carbon fiber reinforced resin processed product having an end surface", "a carbon fiber reinforced resin processed product", "a CFRP processed product", "a cutting processed product", or "a processed product".

The carbon fiber reinforced resin processed product according to the present invention is obtained by processing a carbon fiber reinforced resin shaped product (hereinafter, there may be a case of being abbreviated to a CFRP shaped product) containing carbon fibers and a resin. Here, the term "processing" includes a case where an adjustment is performed in order to obtain the above-referenced surface roughness (Rz) at the time of molding, in addition to treatment accompanying removal of materials, such as cutting and cutting-off of a molded carbon fiber reinforced resin shaped product.

In other words, the carbon fiber reinforced resin processed product according to the present invention can also be obtained through molding using a die in which roughness of a surface in a place corresponding to the end surface is adjusted, treatment of a carbon fiber reinforced resin performed with a hot roller, shaping performed with a 3D printer, and the like.

In addition, in the present invention, for convenience, a shaped product before the processing is referred to as "the carbon fiber reinforced resin shaped product" (hereinafter, there may be a case of being abbreviated to the CFRP shaped product) and a shaped product after the processing is referred to as "the carbon fiber reinforced resin processed product". However, since the shaped product after processing is still the shaped product, "the carbon fiber reinforced resin processed product" can also be referred to as "the carbon fiber reinforced resin shaped product" in a general meaning.

In addition, for example, in a case of having a plate shape, the carbon fiber reinforced resin shaped product may also be referred to as "a carbon fiber reinforced resin shaped plate".

[Carbon Fiber Reinforced Resin Processed Product having End Surface with Particular Surface Roughness]

The carbon fiber reinforced resin processed product having an end surface with particular surface roughness according to the present invention is a composite material containing carbon fibers and a resin. The carbon fiber reinforced resin processed product according to the present invention has the carbon fibers in a matrix formed of a resin and can exhibit mechanical strength more excellent than a material formed of a resin alone. In addition, it is also possible to realize the weight reduction compared to a composite material containing glass fibers as the reinforced fibers.

As it has been commonly used in the field of machine processing, the end surface according to the present invention includes a cut surface obtained when an object is cut, aside surface of a plate-like object, a surface of the tip of a rod-like object or a tube-like object, and the like. However, without being limited to only the above-referenced surfaces, the end surface indicates another surface smaller than the main surface in an object (the CFRP processed product). The end surface is not limited to a portion at the end of an object. For example, the end surface also includes a surface of a hole portion drilled in a central portion of a plate-like object.

The carbon fiber reinforced resin processed product having an end surface according to the present invention is a processed product having an end surface with excellent smoothness. The number of end surfaces in the carbon fiber reinforced resin processed product may be one, or two or more.

The end surface is excellent in surface nature, and particularly in smoothness. The surface roughness (Rz) which is one of the indexes indicating the smoothness of a surface is 50 µm or less. Since Rz is 50 µm or less, there is little separation or a burr on the end surface, and slight unevenness due to adhering cutting chips derived from the fluff of the carbon fiber or the resin. Thus, the end surface is sufficiently smooth. The surface roughness (Rz) is preferably 30 µm or less, is more preferably 25 µm or less, and is further more preferably 12.5 µm or less. When Rz is 6.3 µm or less, the appearance is remarkably favorable, and design and handleability are also favorable. The smoothness is improved as the lower limit value of Rz draws near 0 µm. In the present invention, the lower limit of Rz is 5 µm. When Rz is smaller than 5 µm, for example, in a case of bonding the end surface to a different member by using an adhesive, the adhesive is unlikely to permeate the inside of the end surface. Accordingly, there are many cases where an anchor effect on the adhesion surface (the end surface) cannot be sufficiently exhibited. When bonding the end surface to a different member by using an adhesive, it is favorable that the end surface is slightly rough, and thus, it is advantageous that Rz is greater than 5 µm (for example, within a range from 15 µm to 35 µm).

When Rz of the end surface is favorably within the above-referenced favorable range, the CFRP processed product according to the present invention is safe for handling and excellent in handleability by hand without protection, and is further suitable for adhesion via the end surface and the like.

Rz of the end surface is "the maximum height" (roughness) measured through a method based on JIS B0601:2001. The maximum height (roughness) Rz is the sum of the maximum value of the height of the peak and the maximum value of the depth of the groove in a reference length of a roughness curve (contour curve).

The maximum height (roughness) Rz is characterized in that the presence of uniquely high point can be easily reflected as compared with the surface roughness such as an arithmetic average value.

As the shape of the carbon fiber reinforced resin processed product according to the present invention having an end surface, for example, it is possible to exemplify a plate-like body having a thickness within orange from 1.0 mm to 30 mm, a three-dimensional structure body having a surface gently curved in the longitudinal direction, a three-dimensional structure body having a rib portion, and the like. However, there is no particular limitation.

Here, as the shape of the end surface, for example, it is possible to exemplify a polygon, a curved surface shape, and a combination thereof. However, there is no particular limitation. As the polygon, for example, it is possible to exemplify a rectangular shape and a trapezoidal shape having regular heights, a stepped shape and a projection portion shape having two or more heights different from each other, an oblique sectional shape having a height which continuously changes, and the like.

The size (height) of the end surface is not particularly limited. It is preferable that the height from the bottom line of the polygon or the curved surface in the perpendicular direction is 1 mm or more in terms of mechanical strength. Regarding the shape of the end surface having heights different from each other, for example, on a projection-shaped end surface of a shaped product having a protrusion portion in a plate-like body, in a case where the area of the protrusion portion is greater than the area of the projection-shaped bottom surface portion, instead of the highest portion (the protrusion portion) of the projection portion as the height from the bottom line, the height of a lower portion other than the protrusion portion, that is, the thickness of the projection-shaped bottom surface portion may be considered as the height of the end surface. The height of the highest portion (protrusion portion) in the projection shape is preferably 30 mm or less. In a case where the carbon fiber reinforced resin processed product is a three-dimensional structure body which has a rib portion on a flat plate having a constant height and has an end surface in a direction orthogonal to the rib portion, a part or the entirety of the rib portion corresponds to the above-described protrusion portion.

The height of the end surface mentioned in the present invention usually means the thickness of the carbon fiber reinforced resin processed product In a case where the end surface is obtained by cutting, a value of the thickness of a substantially plate-shaped portion when the surroundings of a cutting portion are viewed microscopically may be used as the height thereof.

In a case where the end surface has a uniform square shape (rectangular shape), it is preferable that the height is within a range from 1 mm to 30 mm.

As described below, it is preferable that the carbon fiber reinforced resin processed product having an end surface according to the present invention is a substantially in-plane isotropic processed product in which the carbon fibers are not oriented in a particular direction in an in-plane direction. In other words, it is preferable that the carbon fibers are randomly oriented in the two-dimensional direction. Therefore, in the present invention, it is preferable that the end surface becomes a surface in a direction substantially perpendicular a surface orthogonal) to at least one flat surface portion (in-plane direction) of the processed product. Here, the term "substantially" denotes a range within ±10° with respect to the flat surface portion configuring the shaped product, and preferably denotes a range within ±5°.

The CFRP processed product of the present invention is preferable when there is no irregularly shaped portion on the end surface thereof. The above-referenced term "the irregularly shaped portion" does not indicate a complicated shape portion which is intendedly provided for a certain purpose. The term denotes, for example, a burr generated during cutting, a separated portion of a CFRP component such as a resin and reinforced fibers, a crack, and the like.

(Carbon Fiber)

As the carbon fiber used in the present invention, without being particularly limited thereto, a carbon fiber having high strength and a high elastic modulus can be used, and one type or two or more types of such carbon fibers may be used together. Generally, a polyacrylonitrile (PAN)-based carbon fiber, a petroleum pitch-based carbon fiber, or a coal-pitch-based carbon fiber, a rayon-based carbon fiber, a cellulose-based carbon fiber, a lignin-based carbon fiber, a phenol-based carbon fiber, a vapor grown carbon fiber, and the like are known. In the present invention, any one of the above-referenced carbon fibers can be suitably used. Among them, it is possible to preferably exemplify a PAN-based carbon fiber, a pitch-based carbon fiber, and a rayon-based carbon fiber.

In the present invention, among them, it is preferable to use a polyacrylonitrile (PAN)-based carbon fiber in terms of excellent tensile strength. In a case where a PAN-based carbon fiber is used as the carbon fiber, the tensile elastic modulus is preferably within a range from 100 GPa to 600 GPa, is more preferably within a range from 200 GPa to 500 GPa, and is further more preferably within a range from 230 GPa to 450 GPa. In addition, the tensile strength is preferably within a range from 2,000 MPa to 10,000 MPa and is more preferably within a range from 3,000 MPa to 8,000 MPa.

The form of the carbon fiber used in the present invention is not particularly limited.

Regarding the form of the carbon fiber, continuous fibers or discontinuous fibers may be applied.

As the continuous fibers, for example, it is possible to exemplify fabric, knitted fabric, non-woven fabric, a mat, a knit, a braid, and a unidirectional material in which carbon fibers are disposed in one direction. The continuous fibers may be so-called UD sheets in which the continuous fibers are arranged in one direction an as to have a sheet shape. In other words, the carbon fiber reinforced resin shaped product according to the present invention may be configured to have one or more UD sheets. The UD sheets can be used by combining two or more types thereof. In a case where the fibers are disposed in one direction, multiple layers can be stacked by changing the direction, for example, multiple layers can be alternately stacked. In addition, it is preferable that the stacked surface is disposed with symmetry in the thickness direction. As a method of manufacturing the unidirectional material, a general method can be utilized. For example, after unidirectional plastic tapes are prepared through the method disclosed in JP-A-2013-104056, a shaped product may be obtained by stacking the prepared tapes. In this case, when the UD sheets are used, it is possible to use the UD sheets in which multiple layers are stacked such that fiber arrangement directions of the layers intersect each other (for example, alternately stacked in directions orthogonal to each other).

Figure 4A:
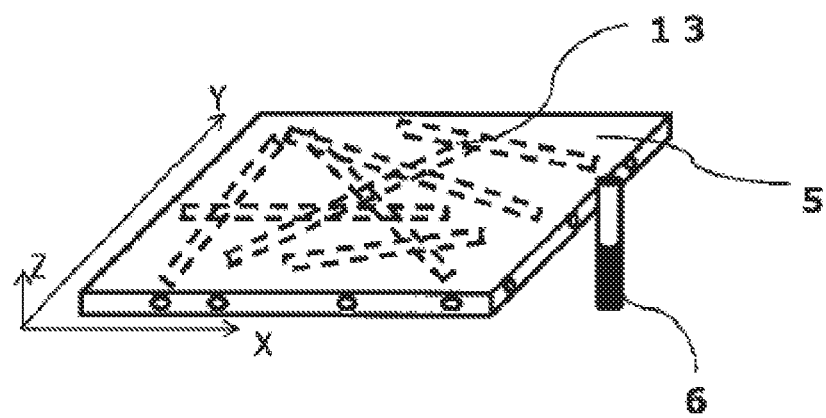
FIG. 4A is a schematic view illustrating an example of cutting a carbon fiber reinforced resin shaped product in which carbon fibers are randomly oriented in an in-plane direction.

In a case where the discontinuous fibers are used in the resin, for example, it is possible to exemplify a material in which carbon fibers are disposed so as to be oriented in a particular direction, a material in which carbon fibers are disposed so as to be randomly dispersed in the in-plane direction, and the like. The carbon fibers according to the present invention may be the discontinuous fibers and may be randomly oriented in the in-plane direction (XY-direction of FIGS. 4A-4C). Here, the expression "randomly oriented in the in-plane direction" denotes state where the carbon fibers are disorderly oriented in the in-plane direction of the fiber reinforced resin processed product of the present invention instead of a particular direction such as one direction, and are disposed within the sheet surface as a whole without exhibiting a particular directionality. In a case where the carbon fibers are randomly oriented in the in-plane direction, it is preferable that the carbon fibers are substantially isotropic materials having no anisotropy in the in-plane direction of the fiber reinforced resin processed product. In this case, when the fiber reinforced resin processed product is prepared, a molding material may be formed to have a sheet shape through a wet paper making method, or may be formed to have a sheet shape or a mat shape (hereinafter, may be collectively referred to as a mat) by disposing the discontinuous carbon fibers such that the discontinuous carbon fibers are dispersed and overlap each other.

When the discontinuous carbon fibers are used in the present invention, since the discontinuous carbon fibers are excellent in balance at mechanical characteristics, the surface nature of the end surface, formativeness inside a molding die, and in productivity of the carbon fiber reinforced resin processed product having an end surface, the discontinuous carbon fibers can be preferably applied. Therefore, in the present invention, a case of using the discontinuous carbon fibers will be mainly described.

The carbon fibers according to the present invention may include both the carbon fibers which are aligned in one direction and the carbon fibers which are randomly oriented in the in-plane direction. In other words, both the continuous fibers which are aligned in one direction so as to have the sheet shape and the discontinuous fibers which are randomly oriented in the in-plane direction may be combined (for example, stacked) and may be included in the carbon fiber reinforced resin shaped product.

Regarding the fiber length of the discontinuous carbon fibers used in the present invention, the discontinuous carbon fibers of which the average fiber length is 1 mm or more are preferably used and the discontinuous carbon fibers of which the average fiber length is within a range from 1 mm to 100 mm are more preferably used. The average fiber length is further more preferably within a range from 3 mm to 100 mm, is still more preferably within a range from 10 mm to 100 mm, is yet more preferably within a range from 10 mm to 50 mm, and is most preferably within a range from 12 mm to 50 mm. When the discontinuous fibers having such a particular length are used, surprisingly enough, it is possible to obtain an end surface in which a small number of melting burrs are generated, of which smoothness is excellent, and of which the surface properties are favorable. It is considered that this is caused by small strength and low rigidity of such discontinuous fibers compared to the carbon fibers having only the continuous fibers. In addition, as described below, it is preferable that the discontinuous carbon fibers in the carbon fiber reinforced resin processed product having an end surface according to the present invention are disorderly and randomly oriented with respect to the in-plane direction of the carbon fiber reinforced resin shaped product. Such an orientation state contributes to provide a cut surface having the favorable surface properties. In other words, discontinuous properties of fiber having a particular average fiber length and a state where the discontinuous fibers are randomly oriented in the in-plane direction of the carbon fiber reinforced resin shaped product synergistically act, thereby exhibiting a remarkably distinguished effect, that is, excellent surface properties of the cut surface.

In the present invention, the carbon fibers of which the fiber lengths are different from each other may be used together. In other words, the carbon fibers used in the present invention may be carbon fibers having a single peak in the distribution of the fiber lengths or may be carbon fibers having multiple peaks.

Regarding an average fiber length (La) of the carbon fibers, for example, the fiber lengths of one hundred fibers which are randomly extracted from the carbon fiber reinforced resin processed product having an end surface are measured to the unit of 1 mm by using a vernier caliper or the like, and thus, the average fiber length (La) can be obtained from all measured lengths (Li) of the carbon fibers based on the following expression.

$$La = \Sigma Li/100$$

When the average fiber length according to the present invention is measured, a number-average fiber length or a weight-average fiber length may be measured. However, it is preferable that the average fiber length is measured based on the weight-average fiber length which is calculated so as to be set with a high value on the long fiber length. When the fiber length of each carbon fiber is Li, and the number of measured fibers is j, a number-average fiber length (Ln) and a weight-average fiber length (Lw) are respectively obtained through the following expressions (1-1) and (1-2).

$$Ln = \Sigma Li/j \tag{1-1}$$

$$Lw = (\Sigma Li^2)/(\Sigma Li) \tag{1-2}$$

In a case where the fiber lengths are regular lengths such as a case where the fibers are cut by using a rotary cutter described below, the values of the number-average fiber length and the weight-average fiber length are the same as each other.

The carbon fibers can be extracted from the carbon fiber reinforced resin processed product having an end surface, for example, by performing heating treatment with respect to the carbon fiber reinforced resin processed product having an end surface at the temperature of 500° C. approximately for an hour and removing the resin inside a furnace.

Usually, the average fiber diameter of the carbon fibers is preferably within a range from 3 μm to 50 μm, is more preferably within a range from 4 μm to 20 μm, is further more preferably within a range from 4 μm to 12 μm, is still more preferably within a range from 5 μm to 12 μm, is particularly and preferably within a range from 5 μm to 8 μm, and is most preferably within a range from 5 μm to 7 μm. The preferable range of the average fiber diameter of the carbon fiber may be a combination of the above-referenced lower limit values of the ranges and upper limit values of different ranges. As an example thereof, it is possible to exemplify a range from 5 μm to 20 μm.

Here, the above-referenced average fiber diameter indicates the diameter of a single fiber of the carbon fibers.

Therefore, in a case where the carbon fibers are in a fiber bundle state, the average fiber diameter indicates the diameter of a carbon fiber (a single fiber) constituting a fiber bundle instead of the diameter of the fiber bundle.

For example, the average fiber diameter of the carbon fibers can be measured through a method disclosed in JIS R-7607:2000.

The carbon fibers used in the present invention may be only the carbon fibers in a single fiber state, may be only the carbon fibers in the fiber bundle state, and may be the carbon fibers in which both the carbon fibers are mixedly present. In a case where the carbon fibers in the fiber bundle state are used, the numbers of the single fibers constituting each fiber bundle may be substantially uniform in each of the fiber bundles or may be different from each other.

In a case where the carbon fibers used in the present invention are in the fiber bundle state, the number of the single fibers constituting each fiber bundle is not particularly limited. However, the numbers of the single fibers is usually within a range from 1,000 to 100,000.

Generally, the carbon fibers are in the fiber bundle state where several thousands to several ten thousands of filaments are gathered. In a case where the carbon fiber bundle is used as the carbon fiber, when the carbon fiber bundle is used as it is, there may be a case where interlaced portions in the fiber bundle become locally thick, thereby being difficult to obtain a thin carbon fiber reinforced resin processed product having an end surface. Therefore, in a case where the carbon fiber bundle is used as the carbon fiber, the carbon fiber bundle is usually used by being widened in width or being opened.

In a case where the carbon fiber bundle is used by being opened, an opening degree of the fiber bundle after being opened is not particularly limited. However, it is preferable that the opening degree of the carbon fiber bundle is controlled and the carbon fibers include the carbon fiber bundle having equal to or more than a particular number of the carbon fibers and the carbon fibers (single fibers) or the carbon fiber bundle having the carbon fibers less than the particular number. In this case, specifically, it is preferable that the carbon fibers include a carbon fiber bundle (A) constituted by carbon fibers of the critical number of single fiber or more defined by the following expression (1) and the opened carbon fibers other than thereof. The opened carbon fibers other than thereof means in other words, carbon fibers in a single fiber state or fiber bundles constituted by carbon fibers of less than the critical number of single fiber.

$$\text{Critical Number of Single Fiber} = 600/D \qquad (1)$$

(here, D indicates the average fiber diameter (μm) of the carbon fibers)

Specifically, in a case where the average fiber diameter of the carbon fibers constituting the carbon fiber reinforced resin processed product is within a range from 5 μm to 7 μm, the critical number of single fiber defined by the above-referenced expression (1) is within a range from 86 to 120. Then, in a case where the average fiber diameters of the carbon fiber is 5 μm, the average fiber number in the carbon fiber bundle (A) is within a range from 240 to less than 4,000. However, the average fiber number in the carbon fiber bundle (A) is preferably within a range from 300 to 2,500, and is more preferably within a range from 400 to 1,600. In addition, in a case where the average fiber diameter of the carbon fibers 7 μm, the average fiber number in the carbon fiber bundle (A) is within a range from 122 to 2,040. However, the average fiber number in the carbon fiber bundle (A) is within a range from 150 to 1,500, and is more preferably within a range from 200 to 800.

Moreover, in the present invention, a ratio of the carbon fiber bundle (A) with respect to the total quantity of the carbon fibers in the carbon fiber reinforced resin processed product having an end surface is preferably within a range greater than 0 Vol % and less than 99 Vol %, is more preferably within a range from 20 Vol % to less than 99 Vol %, is further more preferably within a range from 30 Vol % to less than 95 Vol %, is particularly and preferably within a range from 30 Vol % to 90 Vol %, and is most preferably within a range from 50 Vol % to less than 90 Vol %. In this manner, the carbon fiber bundle having equal to or more than a particular number of carbon fibers and the opened carbon fibers other than thereof or the carbon fiber bundle other than thereof coexist with each other at a particular ratio, and thus, it is possible to enhance the amount, that is, the fiber volume fraction (Vf) of the carbon fibers to be presented in the carbon fiber reinforced resin processed product having an end surface.

The opening degree of the carbon fibers can be within a target range by adjusting opening conditions of the fiber bundle. For example, in a case where the fiber bundle is opened by blowing the fiber bundle with gas such as air, the opening degree can be adjusted by controlling pressure and the like of the air with which the fiber bundle is blown. In this case, when the air pressure is raised, the opening degree tends to increase (the number of single fibers constituting each fiber bundle decreases), and when the air pressure is lowered, the opening degree tends to decrease (the number of single fibers constituting each fiber bundle increases).

In the present invention, an average fiber number (N) in the carbon fiber bundle (A) is not particularly limited and can be appropriately determined within a range in which the object of the present invention is not affected. Usually, N is set to be within a range of 1<N<12,000. However, it is more preferable that the following expression (2) is satisfied.

$$0.6\times10^4/D^2 < N < 6\times10^5/D^2 \qquad (2)$$

(here, D indicates the average fiber diameter of the carbon fibers (μm))

When the average fiber number (N) in the carbon fiber bundle (A) satisfies the above-referenced range, it is easy to obtain a high fiber volume fraction (Vf), and flatness of the carbon fiber reinforced resin processed product having an end surface is favorable, even though the flatness depends on the method of manufacturing. In a case where N is greater than $0.6\times10^4/D^2$, it is easy to obtain a high fiber volume fraction (Vf), which is preferable. In addition, in a case where the average fiber number (N) in the reinforced fiber bundle (A) is less than $N < 6\times10^5/D^2$, and particularly in a case of being less than $1\times10^5$, in an unimpregnated precursor or the carbon fiber reinforced resin processed product having an end surface which is a final product, a portion which is locally thick is unlikely to be generated, and void formation is prevented, which is preferable.

(Resin)

The resin (hereinafter, may be referred to as a matrix resin) used in the present invention is not particularly limited as long as a carbon fiber reinforced resin processed product having an end surface with a desired strength can be obtained. The resin can be appropriately selected and used in accordance with the purpose and the like of the carbon fiber reinforced resin processed product having an end surface.

Generally, as a representative matrix resin used in a fiber reinforced composite material, there are known resins such as a thermoplastic resin and a thermosetting resin. In the present invention, any one of the thermoplastic resin and the thermosetting resin can be suitably used as the matrix resin. In addition, in the present invention, the thermosetting resin and the thermoplastic resin may be used together as the matrix resin. However, in the present invention, it is preferable to use the thermoplastic resin particularly in regard to the point of being able be reused.

The thermoplastic resin is not particularly limited. A thermoplastic resin having a desired softening point or a desired melting point can be appropriately selected and used in accordance with the purpose and the like of the carbon fiber reinforced resin processed product having an end surface according to the present invention.

As the thermosetting resin, it is possible to exemplify a hardened material such as an epoxy resin, a vinyl ester resin, an unsaturated polyester resin, a diallyl phthalate resin, a phenolic resin, a maleimide resin, a cyanate resin, a benzoxazine resin, and a dicyclopentadiene resin. However, it is preferable to use an epoxy resin which has particularly excellent adhesional properties and mechanical characteristics. The epoxy resin used in the present invention is not particularly limited as long as the epoxy resin has an epoxy group in the molecules. For example, it is possible to exemplify a bisphenol A-type epoxy resin, a bisphenol F-type epoxy resin, a phenol novolak-type epoxy resin, a cresol novolak-type epoxy resin, a bisphenol AD-type epoxy resin, a biphenyl-type epoxy resin, a naphthalene-type epoxy resin, an alicyclic epoxy resin, a glycidyl ester-based resin, a glycidyl amine-based epoxy resin, a heterocyclic epoxy resin, a diaryl sulfone-type epoxy resin, a hydroquinone-type epoxy resin, a modified material thereof, and the like. The above-referenced materials can be used alone or multiple materials can be used in a combination. It is preferable that the thermosetting resin is preferable from the viewpoint of high rigidity and strength.

As the thermoplastic resin according to the present invention, usually, a thermoplastic resin of which the softening point is within a temperature range from 180° C. to 350° C. is used. However, the thermoplastic resin is not limited thereto. For example, it is possible to exemplify a polyolefin resin, a polystyrene resin, a thermoplastic polyamide resin, a polyester resin, a polyacetal resin (a polyoxymethylene resin), a polycarbonate resin, a (meth) acrylic resin, a polyarylate resin, a polyphenylene ether resin, a polyimide resin, a polyether nitrile resin, a phenoxy resin, a polyphenylene sulfide resin, a polysulfone resin, a polyketone resin, a polyether ketone resin, a thermoplastic urethane resin, a fluorine-based resin, a thermoplastic polybenzimidazole resin, and the like.

As the above-referenced polyolefin resin, for example, it is possible to exemplify a polyethylene resin, a polypropylene resin, a polybutadiene resin, a polymethyl pentene resin, a vinyl chloride resin, a vinylidene chloride resin, a vinyl acetate resin, a polyvinyl alcohol resin, and the like.

As the above-referenced polystyrene resin, for example, it is possible to exemplify a polystyrene resin, an acrylonitrile-styrene resin (AS resin), an acrylonitrile-butadiene-styrene resin (ABS resin), and the like.

As the above-referenced polyamide resin, for example, it is possible to exemplify a polyamide 6 resin (nylon 6), a polyamide 11 resin (nylon 11), a polyamide 12 resin (nylon 12), a polyamide 46 resin (nylon 46), a polyamide 66 resin (nylon 66), a polyamide 610 resin (nylon 610), and the like.

As the nylon (hereinafter, may be referred to as "PA") which is one of the polyamide-based resins, it is preferable to select at least one type from the group including PA6 (also referred to as polycaproamide, polycaprolactam, or poly-ε-caprolactam), PA26 (polyethylene adipamide), PA46 (polytetramethylene adipamide), PA66 (polyhexamethylene adipamide), PA69 (polyhexamethylene azelamide), PA610 (polyhexamethylene sebacamide), PA611 (polyhexamethylene undecamide), PA612 (polyhexamethylene dodecamide), PA11 (polyundecaneamide), PA12 (polydodecaneamide), PA1212 (polydodecamethylene dodecamide), PA6T (polyhexamethylene terephthalamide), PA6I (polyhexamethylene isophthalamide), PA912 (polynonamethylene dodecamide), PA1012 (polydecamethylene dodecamide), PA9T (polynonamethylene terephthalamide), PA9I (polynonamethylene isophthalamide), PA10T (polydecamethylene terephthalamide), PA10I (polydecamethylene isophthalamide), PA11T (polyundecamethylene terephthalamide), PA11I (polyundecamethylene isophthalamide amide), PA12T (polydodecamethylene terephthalamide), PA12I (polydodecamethylene isophthalamide), and polyamide MXD6 (polymethaxylylene adipamide).

As the above-referenced polyester resin, for example, it is possible to exemplify a polyethylene terephthalate resin, a polyethylene naphthalate resin, a polybutylene terephthalate resin, a polytrimethylene terephthalate resin, liquid crystal polyester, and the like.

As the above-referenced (meth) acrylic resin, for example, it is possible to exemplify polymethylmethacrylate.

As the above-referenced modified polyphenylene ether resin, for example, it is possible to exemplify modified polyphenylene ether and the like.

As the above-referenced thermoplastic polyimide resin, for example, it is possible to exemplify thermoplastic polyimide, a polyamide-imide resin, a polyetherimide resin, and the like.

As the above-referenced polysulfone resin, for example, it is possible to exemplify a modified polysulfone resin, a polyether sulfone resin, and the like.

As the above-referenced polyether ketone resin, for example, it is possible to exemplify a polyether ketone resin, a polyether ether ketone resin, a polyether ketone ketone resin, and the like.

As the above-referenced fluorine-based resin, for example, it is possible to exemplify polytetrafluoroethylene and the like.

The thermoplastic resin used in the present invention may be only one type or two or more types. As a form of using two or more types of thermoplastic resins together, for example, it is possible to exemplify a form in which thermoplastic resins having the softening points or the melting points different from each other are used together, a form in which thermoplastic resins having the mean molecular weights different from each other are used together, and the like. However, the form is not limited thereto.

(Composition Ratio)

The amount of the thermoplastic resin or the thermosetting resin to be presented in the carbon fiber reinforced resin processed product having an end surface according to the present invention is not particularly limited and can be appropriately determined in accordance with the type of the resins, the type of the carbon fibers, or the like. Usually, the resin is within a range from 3 parts by mass to 1,000 parts by mass with respect to the carbon fiber of 100 parts by mass. The resin is preferably within a range from 50 parts by mass to 1,000 parts by mass with respect to the carbon fiber of 100 parts by mass, the resin is more preferably within a range from 50 parts by mass to 400 parts by mass with respect to the carbon fiber of 100 parts by mass, the resin is further more preferably within a range from 50 parts by mass to 100 parts by mass with respect to the carbon fiber of 100 parts by mass.

As the volume fraction (fiber volume fraction (Vf)) of the carbon fibers included in the carbon fiber reinforced resin processed product defined through the following expression (3), in the carbon fiber reinforced resin processed product having an end surface according to the present invention, based on the volume (the total quantity of the carbon fibers+the thermoplastic resin) of the processed product, the volume fraction is preferably 55% by volume or less, is more preferably within a range from 15% to 45%, is further more preferably within a range from 25% to 40%. When the fiber volume fraction of the carbon fibers is 15% or more, the stiffening effect is sufficiently exhibited due to the volume fraction, which is preferable. In addition, when the volume fraction is 55% or less, even though it depends on the molding method, a void is unlikely to be generated in the processed product and the physical properties of the processed product are improved, which are preferable. Regarding a cutting method described below, in a case of cutting processing using a laser, it is advantageous to have low Vf because the output of a laser can be decreased. Meanwhile, in a case of using a circular saw, when Vf is low, there may be a breakage during the cutting processing. Therefore, it is advantageous when Vf is relatively high. However, in a case of high Vf, abrasion of blades proceeds easily. Therefore, it is favorable to have a suitable quantity of Vf within the above-referenced range.

$$Vf=100\times \text{carbon fiber volume}/(\text{carbon fiber volume}+ \text{thermoplastic resin volume}) \quad (3)$$

In addition, in the present invention, in a case of a form in which the carbon fibers are randomly oriented in the in-plane direction, it is also preferable that the volume fraction (Vf) of the carbon fibers in the carbon fiber reinforced resin processed product is within a range from 10 Vol % to 70 Vol %, in a case where the volume fraction of the carbon fibers in the carbon fiber reinforced resin processed product is 10 Vol % or more, it is easy to obtain desired mechanical properties, which is preferable. Meanwhile, in a case where the volume fraction thereof is 70 Vol % or less, when a processed product is prepared, the fluidity of a molding material is not deteriorated and it is easy to obtain a desired shape at the time of molding, which is preferable. The volume fraction of the reinforced fibers in the carbon fiber reinforced resin processed product is preferably within a range from 20 Vol % to 60 Vol %, and is more preferably within a range from 30 Vol % to 50 Vol %.

(Orientation of Carbon Fibers)

In the present invention, it is favorable that the discontinuous carbon fibers in the carbon fiber reinforced resin processed product having an end surface are in two-dimensional random orientation in which the long-axis directions of the fibers are randomly oriented in a two-dimensional direction in the in-plane direction of the carbon fiber reinforced resin processed product having an end surface. The carbon fiber reinforced resin processed product having an end surface, in which the carbon fibers are in the two-dimensional random orientation, has excellent isotropy in the in-plane direction. In addition it is suitable for obtaining a processed product having a complicated shape portion such as unevenness.

For example, the form of orientation of the carbon fibers in the carbon fiber reinforced resin processed product having an end surface can be checked by performing a tensile test based on an arbitrary direction of the carbon fiber reinforced resin processed product having an end surface and a direction orthogonal thereto, measuring the tensile elastic modulus, and then, by measuring a ratio (Eδ) obtained by dividing a greater value by a smaller value among the values of the measured tensile elastic modulus. When the ratio of the tensile elastic modulus of the carbon fiber reinforced resin processed product is close to 1, the carbon fibers are randomly oriented in the in-plane direction. In other words, the carbon fibers are in the two-dimensional random orientation. Then, the carbon fiber reinforced resin processed product can be evaluated to be in-plane isotropic. As an example of a specific reference, when Eδ is less than 2, the carbon fibers are in-plane isotropic. When Eδ is 1.5 or less, the carbon fibers are excellent in the in-plane isotropy. When Eδ is 1.3 or less, the carbon fibers are extremely excellent in the in-plane isotropy.

It is preferable that the orientation state of the carbon fibers in the carbon fiber reinforced resin processed product having an end surface used in the present invention are in the two-dimensional random orientation. However, there may be a portion of unidirectional orientation as long as the orientation state is within a range in which the object of the present invention is not deviated and the mechanical properties or the molding characteristics of the carbon fiber reinforced resin processed product having an end surface according to the present invention are not affected. In addition, the orientation state may be in ruleless orientation (an orientation state in which the long-axis directions of the reinforced fibers are not perfectly aligned in one direction while not being perfectly random) which is a state in the middle of the unidirectional orientation and the two-dimensional random orientation. Moreover, depending on the fiber length of the carbon fibers, the long-axis directions of the carbon fiber may be oriented so as to have an angle with respect to the in-plane direction of the carbon fiber reinforced resin processed product, and the carbon fibers may be oriented so as to be interlaced in a floccular manner. Moreover, the carbon fibers may be oriented in a manner similar to bidirectional fabric such as plain fabric and twill fabric, multi-axis fabric, non-woven fabric, a mat, a knit, a braid, paper made from carbon fibers through paper-making, and the like.

In the carbon fiber reinforced resin processed product having an end surface, in addition to the carbon fibers in a state of being in the two-dimensional random orientation in the in-plane direction, carbon fibers in a different orientation state may be included as long as the orientation state is within a range in which the object of the present invention is not affected.

As the above-referenced embodiment including carbon fibers in a different orientation state, for example, it is possible to exemplify (i) an embodiment in which carbon fibers in orientation states different from each other are disposed in the carbon fiber reinforced resin processed product having an end surface in the in-plane direction, and (ii) an embodiment in which carbon fibers in orientation states different from each other are disposed in the carbon fiber reinforced resin processed product having an end surface in the thickness direction. In addition, in a case Where the carbon fiber reinforced resin processed product having an end surface has a stacked structure including multiple layers, it is possible to exemplify (iii) an embodiment in which the orientation states of the carbon fibers included in each layer are different from each other. Moreover, it is possible to exemplify an embodiment in which the embodiments (i) to (iii) are combined.

Among the embodiments (i) to (iii), as a specific embodiment, it is possible to exemplify an embodiment (unidirectional material) in which the long-axis directions of the fibers are aligned in one direction in the embodiment (ii).

The carbon fiber reinforced resin processed product having an end surface according to the present invention may have a single layer structure formed of a single layer, or may have a stacked structure in which multiple layers are stacked.

As the embodiment in which the carbon fiber reinforced resin processed product having an end surface has the above-referenced stacked structure, an embodiment in which multiple layers having the same compositions are stacked may be adopted or an embodiment in which multiple layers having compositions different from each other are laminated may be adopted.

In addition, as the embodiment in which the carbon fiber reinforced resin processed product having an end surface has the above-referenced stacked structure, an embodiment in which layers in the orientation states of the carbon fibers different from each other are laminated may be adopted. As such as an embodiment, for example, it is possible to exemplify an embodiment in which a layer having the carbon fibers in unidirectional orientation and a layer having the carbon fibers in two-dimensional random orientation are stacked.

In a case where three or more layers are stacked, a sandwich structure including an arbitrary core layer and skin layers which are stacked on the front and rear surfaces of the core layer.

In a case where the carbon fiber reinforced resin processed product having an end surface according to the present invention has a configuration in which multiple layers are stacked, the thickness does not indicate the thickness of each layer. The thickness indicates the thickness of the carbon fiber reinforced resin processed product having an end surface in its entirety in which the thicknesses of all of the layers are added.

(Additives)

As described above, the carbon fiber reinforced resin processed product having an end surface according to the present invention includes at least the carbon fibers and the thermoplastic resin or the thermosetting resin. However, without departing from the range in which the object of the present invention is not affected, various types of additives may be included as necessary.

The above-referenced various types of additives are not particularly limited as long as the additives can apply a desired function, characteristics, or the like to the carbon fiber reinforced resin processed product having an end surface in accordance with the purpose and the like.

As the various types of additives used in the present invention, for example, it is possible to exemplify a melt viscosity reducing agent, an antistatic agent, a pigment, a softener, a plasticizer, a surfactant, conductive particles, a filler, carbon black, a coupling agent, a blowing agent, a lubricant, a corrosion inhibitor, a crystal nucleating agent, a crystallization accelerator, a mold-release agent, a stabilizer, an ultraviolet absorber, a coloring agent, an anti-coloring agent, an antioxidant, a flame retardant, a flame retardant aid, an anti-drip agent, a lubricant, a fluorescent whitening agent, a luminous pigment, a fluorescent dye, a flow modifier, inorganic and organic antibacterial agents, an insect repellent, a photocatalytic antifouling agent, an infrared absorbing agent, a photochromic agent, and the like.

(Carbon Fiber Reinforced Resin Shaped Product)

The carbon fiber reinforced resin processed product according to the present invention is obtained by processing a carbon fiber reinforced resin shaped product containing carbon fibers and a resin.

The carbon fiber reinforced resin shaped product will be described. There may be a case where the carbon fiber reinforced resin shaped product is referred to as "the CFRP shaped product" or "the shaped product".

The shape of the carbon fiber reinforced resin shaped product according to the present invention is not particularly limited. It is possible to suitably use a shaped product which is obtained by disposing the above-described molding material (a composition including the carbon fibers, the resin, and the additives as necessary, preferably, a prepreg which can be obtained through Step 3) inside a die in order to obtain the shaped product having a desired shape and being shaped through press molding. In addition, in a case where the above-described molding material is subjected to the cutting processing without being shaped, the molding material itself becomes the shaped product and can be subjected to the cutting processing.

The carbon fiber reinforced resin shaped product is an object obtained by molding the molding material, and the molding method is not particularly limited. It is possible to exemplify molding performed by using a die, molding performed through a heated roller treatment, molding performed by using a 3D printer, and the like.

(Plate Thickness of Shaped Product)

As described below, in the present invention, it is preferable to obtain the carbon fiber reinforced resin processed product having an end surface with particular surface roughness by performing the cutting processing of the carbon fiber reinforced resin shaped product with an end mill. A helix angle of the end mill of a spiral cutting blade which is preferably used in the present invention is within a range from 0° to 25°, which is a relatively small helix angle. Therefore, it is preferable that the thickness (the thickness in the Z-axis direction of FIG. 5) of the carbon fiber reinforced resin shaped product which is a cutting target is shorter than the length of an end mill blade. Specifically, when the end mill has the diameter of 6 mm, the maximum blade length is within a range from 8 mm to 15 mm. Therefore, the thickness of the carbon fiber reinforced resin shaped product is preferably 15 mm or less. When the diameter is 10 mm, the maximum blade length is within a range from 28 mm to 35 mm. Therefore, the thickness of the shaped product is preferably 35 mm or less. Moreover, when the diameter is 12 mm, the maximum blade length is within a range from 40 mm to 48 mm. Therefore, the thickness of the shaped product is preferably 48 mm or less.

Meanwhile, from the viewpoint of modability, particularly from the viewpoint of shaping properties to a die, for example, the shaped product having the thickness within a range from 0.5 mm to 5 mm is suitably used. In addition, the shaped product can be used by using a single layer or stacking two or more layers.

(Method of Manufacturing Carbon Fiber Reinforced Resin Shaped Product)

The carbon fiber reinforced resin shaped product according to the present invention can be manufactured by adopting a known method such as injection molding, extrusion molding, and compression molding. Here, as an example, description will be given regarding a case where the thermoplastic resin is used as the matrix resin, and compress molding is performed by using a material in which the discontinuous fibers (carbon fibers) having particular average fiber lengths are in two-dimensional random orientation.

For example, the carbon fiber reinforced resin shaped product can be manufactured through Step 1 in which the carbon fibers are cut, Step 2 in which the cut carbon fibers are opened, Step 3 in which after the opened carbon fibers are mixed with a fiber-shaped or particle-shaped thermoplastic resin, a prepreg is obtained through heating compression, and Step 4 in which the prepreg is molded. However, the method is not limited thereto.

In Step 1, a strand (carbon fiber bundle) including multiple carbon fibers is continuously slit along the fiber length direction as necessary, thereby obtaining multiple strands each of which has a narrow width within a range from 0.05 mm to 5 mm. Thereafter, the strands are continuously cut so as to have a predetermined fiber length.

In Step 2, the cut carbon fiber bundles are accumulated on a gas-permeable conveyor net or the like in a layered state while being blown with air, for example, and being opened. Accordingly, it is possible to obtain a reinforced fiber mat in which the carbon fiber and the carbon fiber bundle are disorderly and randomly dispersed in the in-plane direction.

In Step 3, substantially at the same time as the Step 2, the particle-shaped or short fiber-shape thermoplastic resin is added to and is mixed with the carbon fiber bundle blown with gas, and the mixture is accumulated on the gas-permeable conveyor net.

In the method of Step 2, when the opening conditions such as pressure at the time of gas-blowing is appropriately adjusted, it is possible to open the carbon fibers such that the carbon fiber bundle (A) constituted by the carbon fibers of the critical number of single fiber or more defined by the above-referenced expression (1) and the opened carbon fibers other than thereof are mixedly present. In other words, it is possible to open the carbon fibers such that the carbon fiber bundle (A) constituted by the carbon fibers of the critical number of single fiber or more, carbon fibers in a single fiber state, and the fiber bundle constituted to by single fibers of less than the critical number of single fiber are mixedly present. Then, when predetermined quantities of the carbon fiber bundle and the thermoplastic resin are used, it is possible to obtain a desired abundance of the carbon fibers, that is, a desired fiber volume fraction (Vf).

In a base material obtained through the method of Steps 2 and 3, the carbon fibers and the carbon fiber bundle are disorderly and randomly dispersed in the in-plane direction. In other words, the base material is an isotropic base material in two-dimensional random orientation in the in-plane direction while being in a state of including the thermoplastic resin.

A carbon fiber area weight in the isotropic base material is not particularly limited. Usually, the lower limit value is set within a range from 25 g/m$^2$ to 10,000 g/m$^2$ and is preferably set within a range from 25 g/m$^2$ to 4,500 g/m$^2$.

The thickness of the isotropic base material used in the present invention is not particularly limited. Usually, the thickness is preferably within a range from 0.01 mm to 100 mm, is more preferably within a range from 0.01 mm to 3 mm, and is further more preferably within a range from 0.1 mm to 1.5 mm.

The average fiber number (N) in the carbon fiber bundle (A) can be controlled to be within the above-referenced range by adjusting the size of the fiber bundle applied in the cutting step, for example, the width of the bundle or the number of the fibers per width through the method of manufacturing the suitable isotropic base material. Specifically, it is possible to exemplify methods such as a method of applying the fibers in the cutting step after opening the width of the fiber bundle by such opening, and a method of providing a slitting step before the cutting step. In addition, slitting may be performed at the same time as the cutting of the fiber bundle.

Next, the isotropic base material including the carbon fibers and the thermoplastic resin is heated to the temperature at which the thermoplastic resin melts and is compressed (pressed), thereby obtaining a prepreg.

In Step 4, the prepreg is disposed inside a die for obtaining the carbon fiber reinforced resin shaped product having an end surface with a desired shape. The disposed prepreg is molded by being compressed or the like in a heated state through heating to the extent that the prepreg can be compressed. After being compressed, the prepreg is cooled to a state where the prepreg can be taken out. Thereafter, the carbon fiber reinforced resin shaped product having an end surface is obtained.

The above-referenced method is an example of the manufacturing method. For example, in the method of Step 3, a prepreg can be obtained by performing heating compression after the melted thermoplastic resin is applied onto the reinforced fiber mat in a film state to be infiltrated.

Usually, the above-described molding material is subjected to press molding in a die in order to obtain a carbon fiber reinforced resin shaped product having a desired shape. There is no particular limitation on the method, and a known method can be adopted. The shape of the obtained carbon fiber reinforced resin shaped product is not particularly limited, and it is preferable to have a plate-like shape having a flat surface portion and the thickness (plate thickness). In the plate-like shape, there may be unevenness such as a rib. In addition, the shape may be a complicated shape such as a hat shape. In the carbon fiber reinforced resin shaped product, the carbon fibers are not oriented in a particular direction in the in-plane direction (the XY-direction of FIGS. 4A-4C) and are disposed so as to be dispersed in random directions. In other words, such a molding material and a shaped product are isotropic materials in the in-plane direction (the XY-direction of FIGS. 4A-4C).

In addition, basically, in the carbon fiber reinforced resin shaped product and the carbon fiber reinforced resin processed product, isotropy of the carbon fibers in the molding material is maintained. Accordingly, isotropy of the carbon fiber reinforced resin shaped product can be quantitatively evaluated by obtaining a ratio of tensile moduli of elasticity in two directions orthogonal to each other. When a ratio obtained by dividing the greater value between the values of the tensile moduli of elasticity in two directions orthogonal to each other by the smaller value is not greater than 2, the carbon fiber reinforced resin shaped product is evaluated to have isotropy. When the ratio is not greater than 1.3, the carbon fiber reinforced resin shaped product is evaluated to have excellent isotropy.

The lengths of the carbon fibers included in the carbon fiber reinforced resin shaped product are expressed by using the average fiber length of the carbon fibers. As a method of measuring the average fiber length, for example, a method of obtaining the average thereof performed by measuring the fiber lengths of one hundred randomly extracted fibers down to the order of 1 mm using a vernier caliper or the like is employed.

(Method of Manufacturing Carbon Fiber Reinforced Resin Processed Product Having End Surface)

The carbon fiber reinforced resin processed product having an end surface according to the present invention may be formed through any method as long as it is possible to obtain a carbon fiber reinforced resin processed product which has a desired size, a desired shape, and an end surface with favorable surface smoothness. However, in the present invention, for example, it is favorable that the carbon fiber reinforced resin shaped product manufactured through the above-described method is subjected to the cutting processing. For example, as described above, processing performed by polishing requires an effort, and it is difficult to mention that this method is excellent in productivity, from the viewpoint of the industrial aspect. In addition, there is a method in which after rough cutting is performed at the initial stage, and second processing is subsequently performed, thereby realizing favorable smoothness. However, in this case as well, processing has to be performed twice as described above, and thus, the method is also disadvantageous in the viewpoint of productivity. When the carbon fiber reinforced resin shaped product is subjected to the cutting processing, specifically, it is possible to obtain a carbon fiber reinforced resin processed product having an end surface according to the present invention, having a cutting processed surface as the end surface.

Here, the cutting processing mentioned in the present invention provides surface nature and smoothness having favorable surface properties in single cutting processing performed once, and substantially, there is no need to perform a step of removing burrs or a step of re-polishing thereafter. Therefore, the cutting processing is preferable in that the man-hours of additional work can be reduced. However, for the purpose requiring smoothness of an extremely high-degree, re-polishing may be performed. It is also advantageous in that the time which was conventionally required for the additional work is shortened.

In other words, cutting processing is processing in which mechanical force acts on a material by using a tool which is configured to be made of a material having hardness equal to or greater than a certain degree so as to produce a product having intended dimensions, a shape, a state of a surface while separating and removing a portion of the material. In other words, the cutting processing includes not only cutting off (FIG. 4B) in narrow meaning but also cutting of an end portion of the material as described in FIG. 4C, for example.

Figure 5:
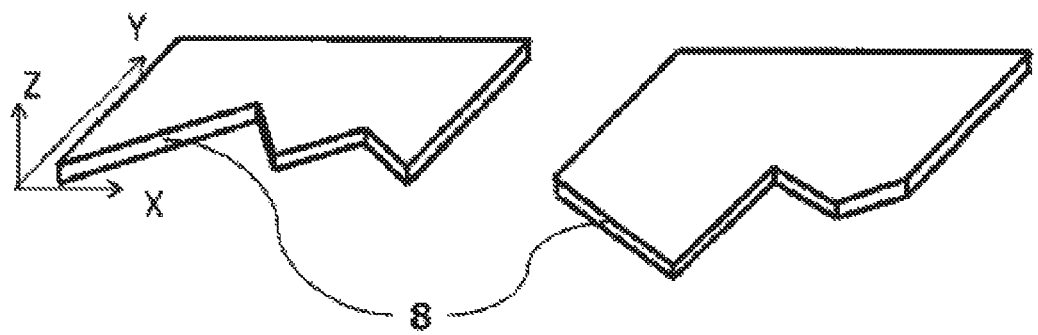
FIG. 5 is a schematic view illustrating an example of a carbon fiber reinforced resin processed product having an end surface.

In addition, as a specific form of a cutting processed product, it is possible to exemplify cutting processed products having various types of shapes as illustrated in FIG. 5.

Next, a cutting processing method of forming a cutting processed surface will be described.

As cutting processing means for obtaining a cutting processed surface, for example, it is possible to exemplify wire electrical discharge processing, electrical discharge processing, laser processing, band saw processing, jigsaw processing, cut processing using diamond abrasive grains (diamond saw processing, blade saw processing, wire saw processing, and diamond cut processing using a grinder), and water jet processing. As the band saw processing, specifically, it is possible to exemplify a serration-type processing with a circular blade or a band blade, and a press cutting-type processing with a share-edge or a guillotine.

Conventionally, in the serration-type processing and the press cutting-type processing, there are cases where precision of dimensions is insufficient or fluff is likely to be generated. However, the cutting processing method using a circular saw, a laser, or water jet is a preferable method since a smooth cutting processed surface (cut surface) can be obtained. Hereinafter, cut processing methods respectively using the above-referenced three types will be described.

1) Circular Saw

In the cutting processing of the carbon fiber reinforced resin shaped product according to the present invention, as a circular saw used in cutting, it is favorable to have cutlery of which the blades rotate and continuously conic into contact with the carbon fiber reinforced resin shaped product. In addition to a general circular saw, it is possible to use cutlery or the like obtained by connecting a string saw blade so as to have a ring shape.

According to the inventors, when the carbon fiber reinforced resin shaped product according to the present invention is cut by using the circular saw, conditions can be appropriately selected so that the surface state of the formed cut surface has desired smoothness and surface properties according to purpose and usage in consideration of complicated relationships among various factors such as the shapes of the circular saw blades, the outer diameter of a disk supporting multiple blades, the rotational frequencies of blades, the number of blades, the distance between blades, the cutting speed, and the feed speed while considering industrial productivity. Hereinafter, conditions of cut processing considered to be particularly important will be described.

Regarding the circular saw blade, multiple blades are formed in the outer circumferential portion of the disk. All cross sectional shapes (the shapes in plan view) of the blades are triangles which are the same as each other or triangular shapes similar thereto. It is preferable that each of the blades has a rake surface of which a rake angle becomes negative in regard to the point of strength of the blade edge. It is preferable to have the rake surface because cutting chips can be further discharged continuously. The rake angle is preferably within a range from +5° to −45°, and is more preferably within a range from −5° to −20°.

Regarding the number of blades in the circular saw blade, for example, when there are too many blades, the number of contact of the blade with respect to the carbon fiber reinforced resin shaped product increases. In such a case, the contact time of the outer circumferential portion of the blade and the disk, and the carbon fiber reinforced resin shaped product is elongated. Accordingly, the carbon fiber reinforced resin shaped product is likely to be heated due to frictional heat. Moreover, a gap between the blades becomes narrow Accordingly, discharging properties of the cutting chips is deteriorated. As a result thereof, a fluff burr (a melting burr caused by heat) is likely to be generated, or a resin is likely to be welded onto the blades. On the contrary, when there are few blades, a cutting length per blade becomes elongated when cutting a unit length. In other words, since a load applied to the blade increases, abrasion of the blade easily proceeds. As a result thereof, the life expectancy of the blade is often affected. Moreover, since the cutting amount per rotation decreases, it is not preferable in regard to the point of productivity.

Regarding the number of blades, from the viewpoint that the cutting chips can be continuously and smoothly discharged, it is preferable to indicate the pitch between blades adjacent to each other, specifically as an occupancy rate of the blade per unit length. The occupancy rate of the blade per unit length is preferably within a range from 0.175 to 0.260, and is more preferably within a range from 0.190 to 0.220. When the occupancy rate of the blade per unit length is within a range from 0.175 to 0.260, the blade can expect compatibility in both the viewpoint of durability of the blade and the viewpoint of suppressing an occurrence of a melting burr. When the lower limit of the occupancy rate of the blade per unit length is smaller than 0.175, it is not preferable in regard to the point of durability of the blade. When the upper limit thereof is greater than 0.260, a melting burr tends to be easily generated.

The cutting speed (the cutting-off speed) which is one of the cutting (cutting-off) conditions is an index indicating cutting (cutting-off) ability of a rotary blade, and when the cutting speed increases, the cutting ability increases. Since the cutting speed is expressed in a product of the rotational frequency, the outer diameter of cutlery such as a circular saw blade, and the circular constant, the cutlery such as a circular saw blade having a relatively large diameter can be considered to be one of the cutting methods having relatively high cutting ability. The cutting speed is preferably within a range from 1,000 m/min to 4,500 m/min, and is more preferably within a range from 1,500 m/min to 3,000 m/min. Particularly, when cutting the carbon fiber reinforced resin shaped product of which the average fiber length of the carbon fibers is within a range from 1 mm to 100 mm, the cutting amount per blade becomes a suitable amount. Accordingly, a fluff burr (a melting burr caused by heat) is unlikely to be generated. When the cutting amount is excessively small, a melting burr caused by heat is likely to be generated.

According to the cutting method disclosed in the lower right column in page 2 in the above-referenced PTL 2, the occupancy rate of blade per unit length is 0.551 (value obtained by dividing the number of blades, 14, per thread by one thread, 25.4 (mm)).

Regarding the angle of the blade edge, as described above, it is preferable when the rake angle is negative angle. Accordingly, it is favorable that the angle of the blade edge is great as well (for example, 90° or more). Since the cutting speed is significant, a load applied to the blade edge during cutting is also significant. Therefore, it is suitable to have a significant angle of the blade edge from the viewpoint of durability of the blade edge.

In addition, in the cut processing, the feed speed of the circular saw blade with respect to the carbon fiber reinforced resin shaped product is usually within a range from 20 mm/s to 600 mm/s, from the viewpoint that cutting chips can be further discharged continuously and therefore, smoothness of the cut surface is further improved.

In the present invention, when the above-described circular saw blade is used, in some cases, there may be problems in that the resin melts due to frictional heat generated during cutting and the life expectancy of the blade is affected due to cutting of the carbon fibers. However, it is possible to obtain a cut surface in which cutting chips of the carbon fiber or the resin is smoothly discharged, little amount of the discharged chips adheres to the cut surface, and the surface roughness (Rz) is 50 µm or less, approximately within a range from 5 µm to 25 µm by appropriately selecting the content, the length, the volume fraction, and the like of the carbon fibers constituting the carbon fiber reinforced resin shaped product to be used; the type and the like of the resin to be used; and the above-described processing conditions.

2) Laser

In cutting processing using a laser, no blade or the like which directly comes into contact with a cutting subject and is abraded is present. Therefore there is no problem of durability of the blade which is a problem to be solved for the circular saw blade. In addition, recently, in accordance with the advancing technology, oscillators have been able to conduct a high-output performance. Therefore, cutting can be performed at a high speed by raising the output of the oscillator, thereby being advantageous in regard to the point of productivity.

Meanwhile, a resin in the surroundings of a radiation portion melts due to heat generated during laser beam radiation, and the temperature of the radiation portion and the surroundings thereof also rises, thereby being is influenced by heat. The circumstances have been a problem particularly in a case where cutting processing of the carbon fiber reinforced resin including the thermoplastic resin is performed with a laser. Therefore, generally, it is difficult to mention that processing precision is high. In addition, there has been indication that problems such as separation, generation of fluff of the carbon fibers, and the like are likely to occur. However, surprisingly enough, as shown in Examples A2-1 and A2-2 described below, it has been found that no separation occurs in the carbon fiber reinforced resin shaped product according to the present invention to be applied in cutting, when processing is performed in a particular condition. Moreover, when the carbon fibers in the carbon fiber reinforced resin shaped product are discontinuous carbon fibers which have a particular average fiber length and are randomly oriented in the two-dimensional direction, it is considered that separation is less likely to occur during cutting.

According to the present invention, in the carbon fiber reinforced resin shaped product and the laser cut processing, it has been found that the energy density of a laser beam per unit time in a cutting portion of the carbon fiber reinforced resin shaped product is important.

The energy density of a laser beam per unit time changes depending on the type of a laser beam, the processing speed, the output, the light concentration diameter (through a lens), the radiation angle of a laser beam (the incident angle on the cut surface), and the like. Therefore, it is possible to obtain a smooth surface in which generation of fluff of the carbon fibers is suppressed and separation and the like are unlikely to occur, by appropriately setting the above-referenced conditions. Accordingly, the amount of energy to the cutting portion of the carbon fiber reinforced resin shaped product a laser irradiation is controlled, and thus, it is possible to reduce the influence to the cutting portion and the surroundings thereof caused by heat.

Among the conditions of a laser used in e present invention, the conditions which are considered to be important will be described.

As a type of a laser, for example, it is possible to exemplify a $CO_2$ laser, various types of excimer lasers, a YAG laser, a fiber laser, and the like.

The oscillation output of a laser varies depending on the type of the laser. However, a laser within a range from 0.5 KW to 4 KW is usually used.

As a radiation method, there are a pulse transmission type and a continuous oscillation type. Usually, the latter type is preferably adopted in regard to the point of productivity.

As a distance between a laser and a portion to be cut, favorable processing precision is obtained when processing is performed within a distance ranging from 0.1 mm to 10 mm.

In the cut processing performed with a laser beam, as atmosphere gas for the cutting portion, it is possible to exemplify air, oxygen, carbon dioxide, nitrogen, argon, helium, and the like. In addition, the flow rate of process gas depends on the shape of a nozzle, the pressure of applying gas, and the like. However, for example, the flow rate may be set within a range from 30 liter/min to 300 liter/min.

The light concentration diameter greatly varies depending on the type of a laser, the optical lens, and the like to be used so that it is not possible to make a sweeping statement. However, as an example, in a case of a $CO_2$ laser having an oscillation output of 1.75 kW, it is favorable to have a light concentration diameter within a range from 150 μm to 500 μm.

3) Water Jet

In the present invention, the carbon fiber reinforced resin shaped product can be cut by using high-pressure water (so-called water jet) which is jetted from a nozzle. With regard to the water jet, there is a concern about the influence of heat caused by processing heat in the surroundings of the cutting portion, which has been a problem of laser processing.

In order to efficiently perform cutting with water jet, it is favorable to intermittently apply the carbon fiber reinforced resin shaped product which is a processing subject product in a cutting direction. For example, the supply speed of a composite material in this case can be set within a range from 10 mm to 2,500 mm/min. Otherwise, high-pressure water may be ejected while scanning is intermittently performed with the nozzle in a direction of cutting the carbon fiber reinforced resin shaped product.

The high-pressure water is not particularly limited as long as the high-pressure water does not cause damage, such as, damage caused by melting or the like to the surface of the carbon fiber reinforced resin shaped product which is a subject to be processed. Thus, it is possible to use known high-pressure water.

In the present invention, polishing particles may be included in the high-pressure water. As the polishing particles to be used, for example, it is possible to exemplify garnet, silica, alumina, diamond, and the like. When the polishing particles are used, processing is effectively performed in a case where the cutting speed increases or the composite material is thick.

As the high-pressure water ejection nozzle, it is possible to use a known high-pressure water ejection nozzle of which the caliber is within a range from approximately 0.05 mm to 1 mm. The caliber of the nozzle has a close relationship with the ejection pressure of high-pressure water. Therefore, in the present invention, it is preferable to use a nozzle having the caliber of 0.1 mm or more.

Moreover, in the present invention, the pressure (discharge pressure) of high-pressure water is acceptable as long as the pressure is 200 MPa or more. However, in consideration of the cutting effect thereof, the pressure is desirably within a range from 300 MPa to 900 MPa. The caliber of the high-pressure water ejection nozzle and the pressure of the high-pressure water may be selected in advance based on the number of the carbon fibers constituting the carbon fiber reinforced resin shaped product to be cut, the thickness of the carbon fiber bundle, the content of the carbon fibers, the thickness of the carbon fiber reinforced resin shaped product, and the like such that cutting is reliably performed.

Regarding the cutting, it is favorable that a cutting subject (carbon fiber reinforced resin shaped product) is cut by applying high-pressure water thereto while advancing in one direction at a regular speed. As the moving speed (feed speed) in this case, for example, processing is favorably performed within a range from 10 mm/min to 2,500 mm/min.

The method of intermittently supplying the carbon fiber reinforced resin shaped product in the longitudinal direction thereof is not particularly limited. Any type of means may be adopted as long as the means is conveyance means for intermittently sending a cutting subject through a belt conveyor, a roller conveyor, a nip roll, and the like. In order to prevent the cutting subject from rising, it is preferable to be provided with a mechanism in which a press plate having a slit that is caved in the cutting direction so as to allow high-pressure water to pass therethrough moves upward and downward in association with the cutting subject.

As a preferable method of manufacturing the carbon fiber reinforced resin processed product having an end surface according to the present invention, there is provided a method of manufacturing the carbon fiber reinforced resin processed product including a step of cutting a carbon fiber reinforced resin shaped product which contains carbon fibers and a resin and providing an end surface performed by using an end mill. The end mill has a spiral cutting blade which is formed on a side surface of a columnar rod member from one end portion along an axis line in a longitudinal direction. A helix angle of the spiral cutting blade is within a range greater than 0° and 25° or less.

Here, as the carbon fiber reinforced resin shaped product, a carbon fiber reinforced resin shaped product having an end surface of which the surface roughness (Rz) is less than 5 μm or greater than 50 μm, or a carbon fiber reinforced resin shaped product which is used for various purposes may be adopted.

[Shape of End Mill]

FIGS. 1A-1B and 2A-2B are views schematically showing end mills which are included in an embodiment of the present invention. In each end mill, the spiral cutting blades are formed from one end portion along the axis line in the longitudinal direction on the side surface of the columnar rod member. The helix angle of each spiral cutting blade is 5°, and the end mills are respectively provided with four blades and eight blades.

Generally, the end mill is a type of a milling cutter which is a tool used in cutting processing. The end mill has the appearance similar to that of a drill. However, the drill is used for the purpose of boring a circular hole with a blade provided at the tip while advancing in the axis line direction. On the contrary, the end mill is used for the purpose or the like of cutting performed with a blade provided on the side surface and/or at the tip, and drilling and widening a hole in a direction orthogonal to the axis line direction. In addition, as the number of cutting blades in the end mill, generally, many end mills has blades within a range from two to four. However, there is an end mill having five or more blades.

When a CFRP shaped product is subjected to cutting by using the end mill with blades having a complicated shape or configuration in which multiple blades having shapes different from each other are combined together, the reinforced fibers are likely to be interlaced on the cut surface. Moreover, when a CFRP shaped product of which the matrix component is the thermoplastic resin is subjected to cutting, there is a case where the thermoplastic resin melts and is stuck due to frictional heat, and cutting chips, that is, thermoplastic resin chips cannot be discharged from the cutting place. In the present invention, cutting is performed by using an end mill having the blades with a simple configuration. Therefore, it is possible to prevent the thermoplastic resin chips from being accumulated at the cutting place, and thus, it is possible to perform cutting in a remarkably smooth manner.

Figure 1B:
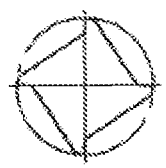
FIG. 1B is an enlarged view viewing, from the left side of the sheet, an α-α cross section of the end mill in the embodiment of the present invention shown in FIG 1A. The end mill has four blades and is right-hand cut with right-hand helix.
Figure 2A:
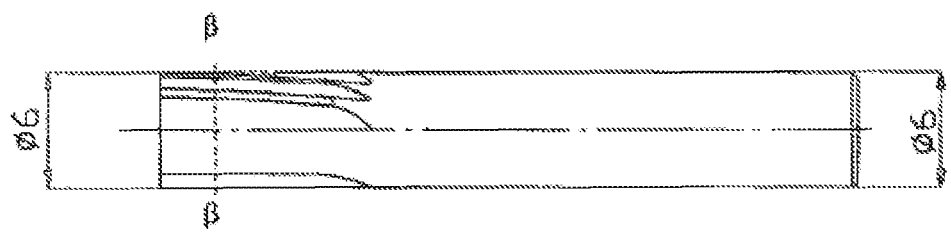
FIG. 2A is a schematic view schematically illustrating a side surface of an end mill (having eight blades), according to an alternative embodiment of the present invention.
Figure 2B:
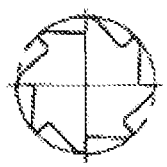
FIG. 2B is an enlarged view, from the left side of the sheet, of a β-β cross section of the end mill in the alternative embodiment of the present invention shown in FIG. 2A. The end mill has eight blades and is right-hand cut with right-hand helix.

The spiral direction of the end mill in the present invention is not particularly limited. The spiral direction may be the clockwise direction or the counterclockwise direction. For example, as illustrated in FIG. 1B, four cutting blades of a right blade with right twist are formed along the axis line in the longitudinal direction of a substantially cylindrical member. The blades are configured to be the spiral cutting blades on the side surface. In addition, FIG. 2B illustrates a schematic view of an end mill configured to have eight cutting blades of a right blade with right twist.

In addition, the end mill according to the present invention may be provided with a nick on the cutting chips discharge surface.

[Helix Angle of End Mill]

Figure 7A:
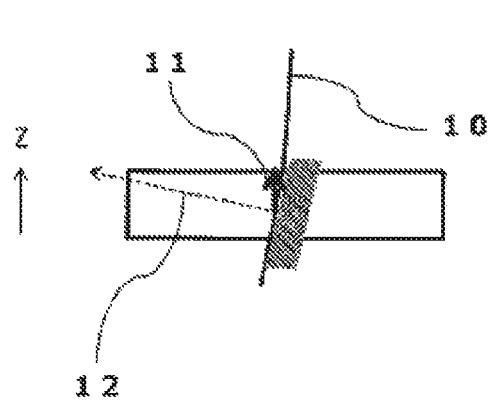
FIG. 7A is a schematic view illustrating cutting force acting in a plate thickness direction of a shaped product (in a case where a blade having a small helix angle is used).
Figure 7B:
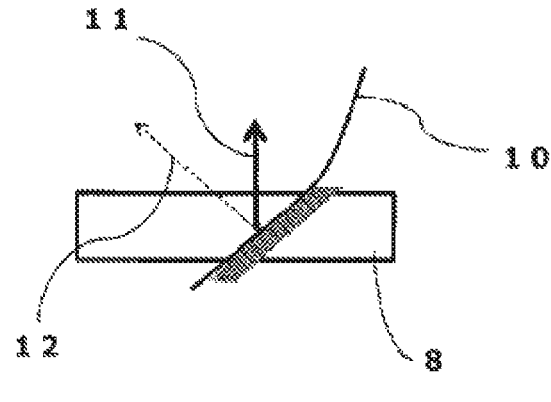
FIG. 7B is another schematic view illustrating cutting force acting in the plate thickness direction of a shaped product (in a case where a blade having a large helix angle is used).

The helix angle of the end mill of the spiral cutting blade according to the present invention is preferably within a range from 0° to 25°. When the helix angle increases, the cutting force in the axial direction (the Z-direction of FIGS. 4A-4C) of the end mill increases (FIG. 7B). Therefore, when cutting force in the plate thickness direction (the Z-direction of FIGS. 4A-4C) of the carbon fiber reinforced resin shaped product increases, the shaped product is subjected to cutting by being raked up. Particularly, when the helix angle of the cutting blade is 25° or more, more significant cutting force in the axis direction (the Z-axis direction of FIGS. 4A-4C) of the end mill acts. Accordingly, more burrs are generated in the conventional cutting method in the related art. Among them, in a case where the carbon fibers are aligned in one direction in the carbon fiber reinforced resin shaped product, are randomly oriented in the in-plane direction, or are contained in a combination thereof, the burr or delamination is more likely to be generated.

Figure 6:
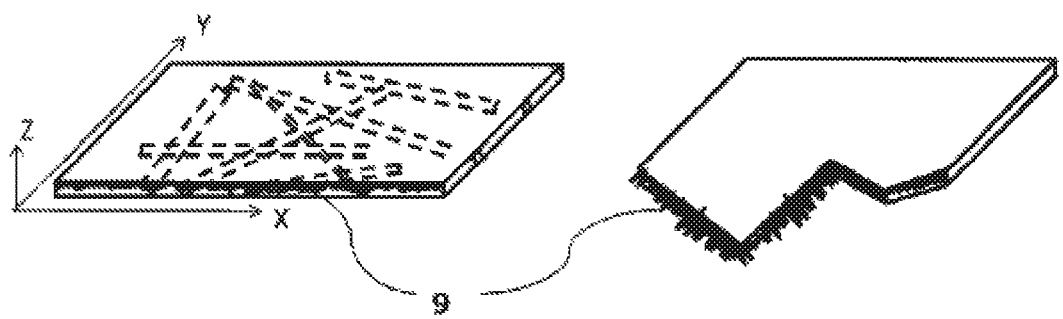
FIG. 6 is a schematic view of a cutting processed product in which burrs are generated on a cutting surface.

FIG. 6 illustrates a schematic view in which burrs are generated in a cutting processed product which is obtained by cutting using an end mill of which the helix angle is 25° or more. As illustrated in FIG. 6, the carbon fibers are raked up from the lower side (the lower side of the sheet in FIG. 6) in the Z-axis direction, thereby resulting in burrs. Accordingly, in most cases, the burrs are concentrated in the end portion of the cutting surface (the upper side of the sheet on the cutting surface) in the opposite direction in which the blade of the end mill rakes up the carbon fibers.

The helix angle is preferably within a range greater than 0° to 25°, is more preferably within a range within greater than 0° and less than 18°, is further more preferably within a range greater than 0° to 15°, is still more preferably within a range greater than 1° and less than 15°, and is particularly and preferably within a range greater than 1° to 10°.

The lower limit of the helix angle may be 0°. However, when the lower limit is 5° or more, cutting resistance with respect to a shaped product becomes low. Accordingly, the life expectancy of the cutting blade is elongated and the cutting quality also becomes favorable, which are preferable.

[Rake Angle and Cutting Quality (Strength of Blade Edge)]

Figure 3:
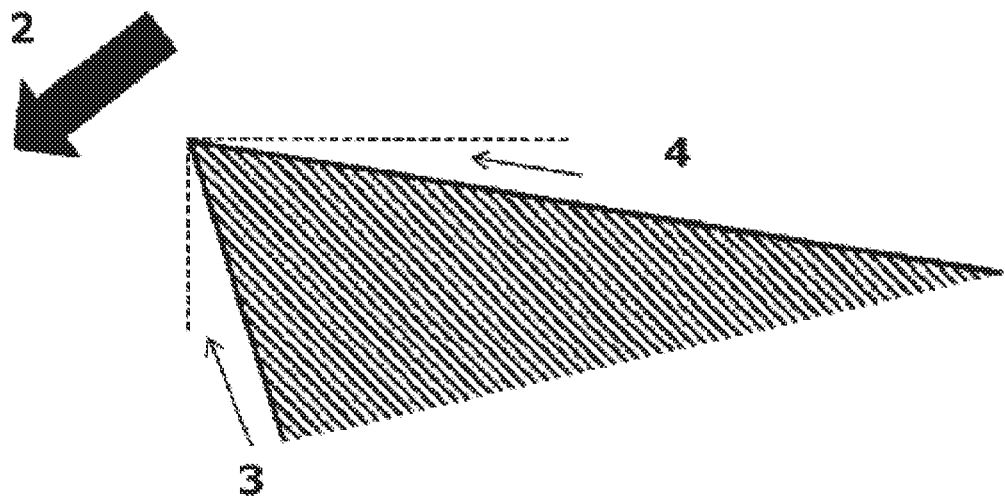
FIG. 3 is a schematic view illustrating an example of an angle of a blade edge of the end mill.

The rake angle denotes the angle 3 in FIG. 3, as illustrated in the schematic view of the blade angle in FIG. 3.

The rake angle of the end mill according to the present invention is not particularly limited. The rake angle of the end mill is preferably within a range from 8° to 16°, is more preferably within a range greater than 8° and less than 15°, is further more preferably within a range from 10° to 15°, and is still more preferably within a range from 10° to 13°. When the rake angle is smaller than 16°, strength of the blade edge increases so that the blade is unlikely to be broken. When the rake angle is 8° or more, the blade edge has an acute angle. Accordingly, the cutting quality is improved.

In the present invention, it is remarkably preferable when the helix angle of the end mill is within the above-referenced range and the rake angle is within the preferable range referenced above, it is possible to expect compatibility in both preventing generation of a burr and separation during cutting and the lengthened life expectancy of the blades which have been conventionally considered to be difficult to be solved.

[Clearance Angle]

The clearance angle denotes an angle of a gap provided so as to avoid the back of the blade edge from coming into contact with a workpiece when cutting is performed by using a tool. The clearance angle is an angle exemplified in the schematic view of the blade angle in FIG. 3 indicated by the reference number 4.

In the end mill according to the present invention and the method of manufacturing a CFRP processed product using the end mill, when the clearance angle is within a range from 3° to less than 30°, a chip of the blade is unlikely to be generated and the cutting surface (end surface) becomes neater, which are preferable. The clearance angle is more preferably within a range from 5° to 25°, is further more preferably within a range from 8° to 18°, and is remarkably and preferably within a range from 10° to less than 15°.

In the present invention, it is more preferable when the helix angle of the end mill is within the above-referenced range and the clearance angle is within the preferable range referenced above.

In the present invention, it is remarkably preferable when the helix angle of the end mill is within the above-referenced range, the rake angle is within the preferable range referenced above, and the clearance angle is within the preferable range referenced above.

[Rotational Frequency of Cutting of End Mill]

Generally, when the diameter of cutlery is 3 mm and a cutting subject material is carbon steel S45C a preferable condition of the rotational frequency of the end mill is within a range from 2,000 rpm to 4,000 rpm. When the rotational frequency is applied to the carbon fiber reinforced resin shaped product with no change, due to the low rotational frequency, the resin constituting the shaped product is burned and carbonized, the end portion of the carbon fiber becomes fluffy, or fibers come off, thereby being difficult to perform cutting. The rotational frequency of cutlery at the time of performing cutting processing of the carbon fiber reinforced resin shaped product by using the end mill according to the present invention is not particularly limited. However, the rotational frequency thereof also depends on the diameter and the like of the cutlery, the rotational frequency thereof is preferably within a range from 5,000 rpm to 15,000 rpm, is more preferably within a range from 6,000 rpm to 10,000 rpm, and is further more preferably within a range from 7,500 rpm to 8,000 rpm.

When the rotational frequency is 5,000 rpm or more, cutting power increases so that a cutting subject is easily cut. In addition, burrs and a fluffy state of the fibers can be sufficiently and easily prevented. Accordingly, it is possible to easily obtain a favorably cutting surface. On the contrary, in a case where the rotational frequency is 15,000 rpm or less, the influence of vibration of cutlery is reduced so that processing precision increases. Thus, it is possible to finish the cutting surface in a favorable state.

[Feed Speed of End Mill]

The feed speed (mm/min) of the end mill is shown through the following expression (4).

$$\text{Feed speed} = \text{cut length per unit blade (mm/}t\text{)} \times \text{number of blades (}t\text{)} \times \text{rotational frequency (1/min)} \quad (4)$$

(t indicates the number of blades)

Here, in a case where the resin included in the shaped product which is the cutting target according to the present invention is a thermoplastic resin, more burrs are generated compared to the case of a thermosetting resin because the resin melts in the thermoplastic resin and "a melting burr" is generated in a case where cutlery generates friction at the same place in the cutting target and frictional heat is generated. Therefore, in a case where the below-described thermoplastic resin is used as the resin, it is more difficult to adjust the cutting condition such as the cut amount per unit blade, the feed speed, and the like compared to a case of using the thermosetting resin.

For example, in a case where the rotational frequency and the number of blades in the expression (4) is constant, and in a case where the cut length per unit blade is small (that is, in a case where the feed speed is reduced), the cutlery easily generates friction at the same place.

The cut length per unit blade is preferably within a range from 0.1 (mm/t) to 0.4 mm/t), and is more preferably within a range from 0.15 (mm/t) to 0.35 (mm/t).

Accordingly, in a case where the number of blades is (t=2 to 8) and the rotational frequency is (1/min=7,000 to 10,000), the lower limit of the feed speed is preferably 1,400 (mm/min), and the upper limit thereof is preferably 32,000 (mm/min). The lower limit thereof is more preferably 2,100 (mm/min), and the upper limit thereof is more preferably 28,000 (mm/min).

In a case where the feed speed exceeds 1,400 mm/min, since the feed speed with respect to the cutting subject is sufficient, cutting does not require much time, not leading to an increase of a cycle time, which is preferable. In addition, in a case where the feed speed of the cutlery falls below 32,000 mm/min, cutting resistance with respect to the end mill falls lower than the rigidity of the cutlery, thereby reducing the probability of damage to the cutlery.

[Diameter of End Mill]

Generally, in a case where the end mill has the same diameter, while polishing of the end mill is performed when producing the cutting blade, if the number of blades increases, it is difficult to cause a polishing machine to intrude deep inside the core of the end mill. Therefore, from the viewpoint of manufacturing the end mill, the diameter of the end mill is preferably from the diameter of 2 mm to the diameter of 18 mm, and is more preferably from the diameter of 4 mm to the diameter of 16 mm.

[Material of End Mill]

As the material constituting the end mill, it is possible to exemplify cemented carbide, high-speed steel, carbon tool steel, alloy tool steel, die steel, cermet, and the like. Among them, it is more preferable to adopt cemented carbide which is excellent in abrasion resistance and toughness. However, the present invention is not particularly limited thereto.

In addition, in a case where metal cutting is performed, it is possible to control the state of an interface between the blade and a material by using cutting oil, cutting water, and a vortex tube having a cooling effect. For example, in a case where high-speed steel is used, the material hardness of the high-speed steel is softened when the temperature rises, thereby being difficult to perform cutting. However, when the cutting oil is used for cooling, cutting can be continuously performed.

[Method of Using CFRP Processed Product and Method of Manufacturing Product Including CFRP Processed Product]

As described above, in the CFRP processed product according to the present invention, the surface roughness Rz of the end surface is within a favorable range, the CFRP processed product is excellent in adhesional properties, handleability, and the like. In a case where the CFRP shaped product is subjected to cutting so as to obtain the CFRP processed product, and a product is produced by using the obtained CFRP processed product as a component, when the CFRP processed product according to the present invention is adopted, even though the cutting surface (end surface) is not subjected to smoothing treatment such polishing, treatment of next step can be performed without damaging a hand of a worker or the contact place during the step. Thus, it is remarkably advantageous in the aspect of productivity. In other words, the present invention includes the invention of a method of using the CFRP processed product while including the step in which the CFRP shaped product is subjected to cutting and an end surface is generated so as to obtain the CFRP processed product of which the surface roughness Rz of the end surface is within a range from 5 μm to 50 μm, and the obtained CFRP processed product is subjected to at least one type of treatment selected from a group including attaching, bonding, assembling, painting, marking, transporting, packing, and the like without being subjected to the smoothing treatment of the end surface.

In other words, the present invention also includes the invention of the method of manufacturing a product including the CFRP processed product of which the surface roughness Rz of the end surface is within a range from 5 μm to 50 μm, the manufacturing method comprising a step in which at least one type of the CFRP shaped product is subjected to cutting so as to obtain the CFRP processed product of which the surface roughness Rz of the end surface is within a range from 5 μm to 50 μm.

As the invention of the manufacturing method, it is preferable to adopt the method of manufacturing a product including the CFRP processed product of which the surface roughness Rz of the end surface is within a range from 5 μm to 50 μm, the manufacturing method comprising the step in which at least one type of the CFRP shaped product is subjected to cutting so as to obtain the CFRP processed product of which the surface roughness Rz of the end surface is within a range from 5 μm to 50 μm, and the step in which the CFRP processed product is subjected to at least one type of treatment selected from a group consisting of attaching, bonding, assembling, painting, marking, transporting, packing, and the like without being subjected to the smoothing treatment of the end surface.

In the invention of the manufacturing method, when the CFRP shaped product is subjected to cutting on as to obtain the CFRP processed product, multiple CFRP processed products per one CFRP shaped product may be obtained, and the multiple CFRP processed products may have the same shapes as each other or may have shapes different from each other.

In the present invention, the CFRP processed product itself may be a product, or the CFRP processed product may be included in a product as a component or the like.

[CFRP Processed Product and Purpose of Product Including the Same]

The purpose of the CFRP processed product or the product according to the present invention is not particularly limited. However, electric and electronic components or a housing, a structure member of an airplane, a structure member of a vehicle such as an automobile, a bonding member which can be used for structure members thereof, and the like are exemplified as particularly suitable purposes. As the structure member of a vehicle such as an automobile which is a CFRP processed product or a product according to the present invention, one or more types selected from the group including an engine hood, a roof, a pillar, a door panel, a side sill, a floor member, a crash box, a bumper, a roof rail, a dash panel, a seatback frame, a fuel cell stack frame, a monocock body is preferably exemplified.

The method of manufacturing the CFRP processed product according to the present invention is remarkably advantageous in a case of manufacturing multiple types of the CFRP processed products having many common points in shapes, for example, in the field of automobile. In the automobile industry, reduction of production cost and design cost is attempted by sharing the components or the basic skeletons of multiple types of vehicles. Instead of performing molding by preparing dies for each type of various CFRP made components, there is a case where the cost can be drastically reduced by adopting a method in which a sharing intermediate body or the largest component is obtained through molding, the CFRP shaped product is subjected to cutting, and various types of components (the CFRP processed products) are manufactured in a classified manner. Particularly, the end mill cutting is performed at low cost and is suitable for obtaining a processed product having a complicated shape, which is preferable.

EXAMPLE

Hereinafter, Example will be described. However, the present invention is not limited thereto.

1) Analysis of Reinforced Fiber Bundle in Isotropic Base Material

An isotropic base material was cut into a size of approximately 100 mm×100 mm.

All the fiber bundles were taken out from the cut isotropic base material by using tweezers. Then, the number (I) of the bundles of the carbon fiber bundles (A), the length (Li) of the fiber bundle, and the weight (Wi) were measured and recorded. When the fiber bundle was too small such that the fiber bundles cannot be taken out by using the tweezers, the weights (Wk) of fiber bundles were collectively measured at the last stage. When the weights were measured, a balance which can measure a weight to the extent of $\frac{1}{100}$ mg was used.

Based on the fiber diameter (D) of the carbon fiber used in the isotropic base material, the critical number of single fiber was calculated. Then, the carbon fiber bundles (A) having the critical number of single fiber or more and carbon fiber bundles other than thereof were divided. In a case where two or more types of carbon fibers used, the fibers were divided for each type to conduct measurement and evaluation.

The method of obtaining the average fiber number (N) in the carbon fiber bundles (A) was as follows.

The number (Ni) of fibers in each carbon reinforced fiber bundle was obtained based on the fineness (F) of the reinforced fibers through the following expression.

$Ni=Wi/(Li \times F)$

The average fiber number (N) in the carbon fiber bundles (A) was obtained based on the number (I) of the bundles in the carbon fiber bundles (A) through the following expression.

$N=\Sigma Ni/I$

The ratio (VR) of the carbon fiber bundles (A) with respect to the total quantity of the fibers in the isotropic base material was obtained by using the density (ρ) of the carbon fibers through the following expression.

$VR=\Sigma(Wi/\rho) \times 100/((Wk+\Sigma Wi)/\rho)$

2) Method of Measuring Average Fiber Length

The lengths of one hundred carbon fibers which were randomly extracted from the prepreg or the shaped product were measured to the unit of 1 mm by using a vernier caliper and a magnifier and were recorded. Then, the average fiber length (La) was obtained from all the measured lengths (Li) of the reinforced fibers through the following expression. In order to take out only the carbon fibers from the prepreg or the shaped product, the resin was removed in the furnace at the temperature of 500° C. approximately for an hour. Thereafter, the carbon fibers were extracted.

$La=\Sigma Li/100$

3) Analysis of Carbon Fiber Orientation in Prepreg

As the method of measuring isotropy of the carbon fibers after the prepreg was produced, a tension test was performed based on an arbitrary direction of a shaped plate and a direction orthogonal thereto, and the tensile elastic modulus was measured. Then, a ratio (Eδ) obtained by dividing a greater value by a smaller value among the values of the measured tensile elastic modulus was measured. When the ratio of the tensile elastic modulus was close to 1, the carbon fibers were considered to be more excellent in isotropy. Specifically, when Eδ was less than 2, the carbon fibers were considered to be in-plane isotropic, that was, two-dimensional random orientation. The shaped plate for analysis in the fiber orientation in Example was molded under the same condition as the product condition of the prepreg in Example.

4) Method of Measuring Rz

Rz of the end surface was measured by a method based on JIS B0601:2001.

5) Method of Evaluating End Surface and Surface State of Surrounding Portion Thereof (Surface Property Evaluation)

The cut surface and the surface state of the surrounding portion thereof "the presence or absence of a burr", "the presence or absence of separation", and the like) were observed visually and by using an electron microscope. As the electron microscope (laser microscope), VK-X100 manufactured by KEYENCE CORPORATION was used.

Manufacture Example A1

Manufacturing of Carbon Fiber Reinforced Resin Shaped Product

As the carbon fiber, the carbon fiber "TENAX" (registered trademark) STS40-24KS (the average fiber diameter of 7 μm) (manufactured by TOHO TENAX CO., LTD.) which was cut into the average fiber length of 20 mm was used. As the matrix, nylon 6 resin A1030 manufactured by UNITIKA LTD. was used. Then, a reinforced fiber mat containing the nylon 6 resin, having a carbon fiber areal weight of 1,800 g/m² and a nylon resin areal weight of 1,500 g/m² in which the carbon fibers were aligned in an in-plane isotropic manner was prepared based on the method disclosed in WO 2012/105080 Pamphlet.

Specifically, as the separation apparatus for the carbon fibers, a slitter which has disk-shaped blades made of cemented carbide, having a pitch of the blades of 0.5 mm was used. As the cutting apparatus, a rotary cutter in which a spiral blade made from cemented carbide was disposed on the surface was used In this case, the pitch of the blades was set to 20 mm, so that the carbon fibers were cut into the fiber length of 20 mm.

The strand which had passed through the cutter was introduced to the flexible transportation piping disposed immediately below the rotary cutter. Subsequently, the strand was introduced to the opening apparatus. As the opening apparatus, nipples made of SUS304 having diameters different from each other were welded together and a duplex tube was manufactured and used. A small hole was provided in the inner tube of the duplex tube, and compressed air was applied between the inner tube and the outer tube by using a compressor. In this case, the wind velocity from the small hole was 100 m/sec. A tapered tube of which the diameter was gradually increased downward was welded in a lower portion of the tube.

The nylon 6 resin was supplied from the side surface of the tapered tube. Then, a gas-permeable support body (hereinafter, will be referred to as a fixing net) moving in a specific direction was equipped in a lower portion of the exit of the tapered tube, and suctioning was performed from below thereof by using a blower. On the fixing net, by reciprocating the flexible transportation piping and the tapered tube in the width direction, mixed bodies of the cut carbon fibers and the nylon 6 resin were accumulated in a belt shape. Then, the supply quantity of the carbon fibers was set to 500 g/min, and the supply quantity of the nylon 6 resin was set to 530 g/min, and the apparatus was operated, thereby obtaining a mat-shaped isotropic base material in which the carbon fibers and the thermoplastic resin were mixed on the fixing net.

The isotropic base material was set to the die and was pressed while maintaining the temperature of 140° C. and the pressure of 5 MPa for one minute. The isotropic base material was temporarily cooled and the prepreg taken out from the die. The carbon fibers in the prepreg were dispersed in a form of two-dimensional random orientation.

The prepreg obtained as described above was heated to the temperature of 290° C. and was subjected to heating compression at 20 MPa for one minute in the pressing apparatus having the size of 400 mm×400 mm including a flat plate molding die heated to the temperature of 150° C. to obtain flat shaped plates (I-0) having desired thickness of for example, 2.3 mm or 2.6 mm.

Next, two flat shaped plates (2.3 mm) were stacked and were bonded together by performing ultrasonic welding by using an ultrasonic oscillator having a single spot (φ10) and the frequency of 20 kHz, thereby obtaining a plate-shaped shaped product (I-1) having the thickness of 4.5 mm.

In the carbon fibers in the shaped plate (I-1), single fiber-like carbon fibers and carbon fibers in a fiber bundle state which were partially opened were mixedly present. The carbon fibers were isotropically dispersed in the plane direction in the shaped plate (I-1), that was, two-dimensional random orientation. The critical number of single fiber was 86, and the average fiber number was 420. The average fiber length was 20 mm. The volume fraction (VI) of the carbon fiber included in the shaped product (I-1) was 35% by volume.

Example A1

Cutting with Circular Saw

As the circular saw blade, a circular saw which was cemented carbide and was subjected to surface treatment of hydrogen free DLC was used.

While the carbon fiber reinforced resin shaped product (the above-referenced shaped product (I-1)) was moved at the feed speed of 12 m/min so as to face the blade of the circular saw, a portion 20 mm away from the end of the shaped product (the thickness of 4.5 mm) in Manufacture Example A1 was cut under the below-described conditions, thereby obtaining the CFRP processed product having an end surface.

Specification of saw blade: outer diameter φ192×blade width 1.6×CH 20.0×number of blades 120
Angle of blade edge: rake angle −15°, clearance angle 13°
Rotational frequency: 4,700 min$^{-1}$
Feed speed: 12 m/min
Occupancy rate of blade per unit length: 0.199 (number of blades/outer diameter)
Cutting speed: 2,840 m/min
Cutter: 5834BA 1050W manufactured by MAKITA CORPORATION
Cutlery cooler: BN-VT600K, NIPPON SEIKI CO., LTD.
Pressure applied to cooler: Air 0.7 MPa There were few adhesive materials such as cutting chips on the surface of the cut surface (end surface), which was remarkably smooth. In addition, there was little heat influence on the cut surface and the surroundings thereof. Separation and a melting burr were not observed. No crack or fluff of the carbon fiber was present. Rz of the cut surface was 8.7 μm.

Example A2-1

Cutting with $CO_2$ Laser

Cut processing was performed with a $CO_2$ laser by using the shaped plate (I-0) (the thickness of 2.6 mm) obtained in Manufacture Example A1. Specifically, cutting was performed by using the $CO_2$ laser manufactured by JENOPTIK AG, while process gas was flowed. The conditions during cutting are described below.

Feed speed: 80 mm/s
Oscillator output: 1.75 kW
Light concentration diameter: 250 μm
Process gas: $O_2$ (100 L/min)

Separation and a burr could not be found on the cut surface. No crack or fluff of the carbon fibers was present. Rz of the cut surface was 24 μm. However, a burn-like trace of the carbon fiber reinforced resin shaped product was observed at a place approximately 2 mm from the edge portion on the cut surface to the flat surface portion of the carbon fiber reinforced resin shaped product. Including the flat surface portion, there was a place on the surface of the cut surface lacking the resin, and a slight amount of power adhered thereto. When the cut surface was observed, a void assumed to be formed due to heat through decomposition of the resin was found on the outer.

Example A2-2

Cutting with Fiber Laser

The shaped plate (I-0) (the thickness of 2.6 mm) obtained in the manufacture example A1 was subjected to cut processing by using a fiber laser. Specifically, a fiber laser manufactured by IPG PHOTONICS CORPORATION was used. While process gas was flowed, a portion 100 mm from the end portion of the shaped plate was irradiated through the length of 400 mm and was cut. The conditions during cutting are described below.

Feed speed: 200 mm/s
Oscillator output: 4 kW
Light concentration diameter: 100 μm
Process gas: $N_2$ (175 L/min)

Separation and a burr could not be found on the cut surface (end surface). The surface roughness (Rz) of the cut surface was 23.1 μm. However, a burn-like trace of the carbon fiber reinforced resin shaped product was observed at a place approximately 1 mm from the edge portion on the cut surface to the flat surface portion of the carbon fiber reinforced resin shaped product. Including the flat surface portion, there was a place on the cut surface lacking the resin, and a slight amount of powder adhered thereto. However, the surface state was better than the case of Example A2-1.

Example A3

Cutting with Water Jet

A portion 100 mm from the end portion of the shaped plate (I-0) (the thickness of 2.6 mm) obtained in the manufacture example A1 was subjected to cutting through the length of 400 mm by applying high-pressure water from the ejection nozzle. The conditions during cutting are described below.

Discharge pressure: 300 MPa
Garnet (#80): 0.27 kg/min
Feed speed of head of machine: 2,000 mm/min
Offset value: 0.4191
Orifice: 0.254 mm
Water jet apparatus: Flow Mach3 AWE manufactured by FLOW INTERNATIONAL CORPORATION Separation and a burr were not formed on the cut surface (end surface). The surface roughness (Rz) of the cut surface was 18.8 μm. No crack or fluff of the carbon fibers was present. However, an abrasion-like trace assumed to be formed due to the garnet was observed on the cut surface.

Comparative Example A1

Cutting with Contour Machine

Cutting was performed by using the shaped plate (I-0) (the thickness of 2.6 mm) obtained in the manufacture example A1. The processing was performed in the same manner as in Example A1 except that the contour machine was used instead of the circular saw. The cutting conditions of the contour machine are described below.

Specification of saw blade: cobalt high-speed steel
Angle of blade edge: approximately 70°
Saw blade speed: 70 m/min
Cutter: CZ-600II, YSKOKI CO., LTD.

Melting burrs and the like were generated on the surface of the cut surface, and separation could also be found. The characteristics of the cutting surface were not favorable. Rz of the cut surface was 58.7 μm. It was inappropriate to use the CFRP processed product as the final product with no change, and the cut surface was in a level requiring secondary processing.

The results of the cutting processed surfaces obtained in Examples and Comparative Examples are summarized in Table 1.

Comparative Example A2

Cutting with Fiber Laser

The shaped plate (I-0) (the thickness of 2.6 mm) obtained in Manufacture Example A1 was subjected to cutting processing with a fiber laser by performing operations in the same manner as in Example A2-2 except that the feed speed was set to 150 mm/s and air (flow rate of 100 L/min) was used as the process gas.

No separation and burrs were found on the cut surface (the end surface) of the obtained CFRP processed product. However, the surface roughness (Rz) of the end surface was 206.1 μm. Many dents which were assumed to be caused by burning of the resin and exposure of carbon fibers were observed.

TABLE 1

| Examples | Rz value on Cut Surface (μm) | Surface State of Cut Surface and surrounding Portion | |
|---|---|---|---|
| | | Presence or Absence of Burr | Presence or Absence of Separation |
| Example A1 | 8.7 | Absent | Absent |
| Example A2-1 | 24 | Absent | Absent |
| Example A2-2 | 23.1 | Absent | Absent |
| Example A3 | 18.8 | Absent | Absent |
| Comparative Example A1 | 58.7 | Present | Present |
| Comparative Example A2 | 206.1 | Absent | Absent |

Hereinafter, description will be given regarding examples of the carbon fiber reinforced resin processed product having an end surface processed through cutting processing by using the end mill. However, the present invention is not limited thereto.

Each of the values in the present example was obtained in accordance with the below-described method.

(1) Regarding the measurement of the average fiber length of the carbon fibers, the fiber lengths of one hundred fibers which were randomly extracted from the shaped plate were measured to the unit of 1 mm by using a vernier caliper, thereby obtaining the average thereof.

(2) The analysis of the fiber bundle of the shaped plate was executed based on the method disclosed in WO2012/105080 Pamphlet.

(3) Analysis of Carbon Fiber Orientation in Carbon Fiber Reinforced Resin Shaped product As the method of measuring isotropy of the carbon fiber reinforced resin shaped product after the molding material was molded, a tensile test was performed based on an arbitrary direction of the carbon fiber reinforced resin shaped product and a direction orthogonal thereto, and the tensile elastic modulus was measured. Then, a ratio (Eδ) obtained by dividing a greater value by a smaller value among the values of the measured tensile elastic modulus was measured. When Eδ was close to 1, it was possible to mention that the carbon fibers contained in the CFRP shaped product exhibited more two-dimensional random orientation and the in-plane isotropy was high. The relationship between the in-plane isotropy and the numerical value of Eδ was the same as those described above.

(4) The end mil having four blades was used.
(5) Evaluation Method
(5-1) Burr and Separation The burr and separations were evaluated through the below-described five-scale evaluation.

Evaluation 5: No burrs or separations were found in all the cutting surfaces throughout the entire surface.

Evaluation 4: Burrs or separations were found in a region within a range greater than 0% to 10% with respect to the entire surface of the cutting surface.

Evaluation 3: Burrs or separations were found in a region within a range from 10% to 50% with respect to the entire surface of the cutting surface.

Evaluation 2: Burrs or separations were found in a region within a range from 50% to 80% with respect to the entire surface of the cutting surface.

Evaluation 1: Burrs or separations were found in a region greater than 80% with respect to the entire surface of the cutting surface.

(5-2) Life Expectancy of Blade

The life expectancy of blades was evaluated based on the below-described five-scale evaluation.

Various types of obtained molded bodies as processing subject materials were subjected to cutting performed with the end mill which had the diameter of 6 mm and was used in Examples. As the cutting conditions, the rotational frequency was set to 8,000 (l/min) and the feed speed was set to 800 mm/min (the feed amount of one blade is 0.025 mm). Then, the life expectancy test was performed for each material.

As the evaluation:

Evaluation 5: Cutting was performed to the extent of 1,200 m, and there was no defect and chipping.

Evaluation 4: The cutting quality was deteriorated at 1,000 m, and burrs or separation was generated.

Evaluation 3: The cutting quality was deteriorated at 800 m, and burrs or separation was generated.

Evaluation 2: The cutting quality was deteriorated at 600 m, and burrs or separation was generated.

Evaluation 1: The cutting quality was deteriorated at 400 m, and burrs or separation was generated.

Manufacture Example B1

Manufacturing of Carbon Fiber Reinforced Resin Shaped Product

As the carbon fiber, the carbon fiber "TENAX" (registered trademark) STS40-24KS (the average fiber diameter of 7 μm) (manufactured by TORO TENAX CO., LTD.) which was cut into the average fiber length of 20 mm was used. As the resin, nylon 6 resin A1030 manufactured by UNITIKA LTD. was used. Then, a mat having a carbon fiber areal weight of 1,800 g/m$^2$ and a nylon resin areal weight of 1,500 g/m$^2$ in which the carbon fibers were oriented in a random manner was prepared based on the method disclosed in WO2012/105080 Pamphlet.

Specifically, as the separation apparatus for the carbon fibers, a slitter which has disk-shaped blades made of cemented carbide, having a pitch of the blades of 0.5 mm was used. As the cutting apparatus, a rotary cutter in which a spiral blade made from cemented carbide was disposed on the surface was used. In this case, the pitch of the blades was set to 20 mm so that the carbon fibers were cut into the fiber length of 20 mm.

The strand which passed through the cutter was introduced to the flexible transportation piping disposed immediately below the rotary cutter. Subsequently, the strand was introduced to the opening apparatus. As the opening apparatus, nipples made of SUS304 having diameters different from each other were welded together and a duplex tube was manufactured and used. A small hole was provided in the inner tube of the duplex tube, and compressed air was applied between the inner tube and the outer tube by using a compressor. In this case, the wind velocity from the small hole was 100 m/sec. A tapered tube of which the diameter was gradually increased downward was welded in a lower portion of the tube.

The resin was supplied from the side surface of the tapered tube. Then, a gas-permeable support body (hereinafter will be referred to as a fixing net) moving in a specific direction was equipped in a lower portion of the exit of the tapered tube, and suctioning was performed from below thereof by using a blower. On the fixing net, by reciprocating the flexible transportation piping and the tapered tube in the width direction, mixed bodies of the cut carbon fibers and the nylon resin were accumulated in a belt shape. Then, the supply quantity of the carbon fibers was set to 460 g/min, and the supply quantity of the resin was set to 540 g/min. Then, the apparatus was operated, thereby obtaining a random mat in which the carbon fibers and the thermoplastic resin were mixed on the support body. The random mat was heated at the pressure of 2.0 MPa for five minutes by using a pressing apparatus which was heated to the temperature of 260° C., thereby obtaining the molding material (i) having the thickness of 1.3 mm.

Regarding the obtained molding material (i), an analysis of the carbon fibers included therein was performed. The critical number of single fiber defined by the above-referenced expression (a) was 86, and the number (N) of average single fibers in the carbon fiber bundle (A) constituted by the carbon fiber of the critical number of single fiber or more was 420. The ratio of the carbon fiber bundle (A) constituted by the carbon fiber of the critical number of single fiber or more was 85 Vol % of the total quantity of the carbon fibers. In addition, the carbon fiber volume fraction was 35% (the carbon fiber fraction 46% of the mass reference).

The molding material (i) was cut out into the size of 400 mm×400 mm and was dried at the temperature of 120° C. for four hours by using a hat air dryer. Thereafter, the temperature was raised to 300° C. by using an infrared-ray heater. A die for a flat plate having the size of 400 mm×400 mm was set to the temperature of 140° C., and the molding material was heated. Thereafter, two heated molding materials were laminated to be introduced into the inside of the die. Next, the molding materials were pressurized at the press pressure of 2 MPa for one minute, thereby obtaining the carbon fiber reinforced resin shaped product (I). The obtained carbon fiber reinforced resin shaped product (I) was cut into the size in accordance with each evaluation.

Manufacture Example B2

The carbon fibers (manufactured by TOHO TENAX CO., LTD) TENAX (registered trademark) STS40-24KS (the fiber diameter of 7 μm and the tensile strength of 4,000 MPa) were the unidirectional materials including the continuous fibers, and a film MXD nylon RENY 6007 (registered trademark) manufactured by MITSUBISHI GAS CHEMICAL COMPANY was laminated so as to have the resin 100 parts by volume with respect to the carbon fiber 100 parts by volume. The film was pasted by using a hot roller at the temperature of 260° C., thereby obtaining the unidirectional molding material (ii) having t=0.02 mm and Vf 50%.

The unidirectional molding material (ii) was cut out into the size of 400 mm×400 mm and was dried at the temperature of 120° C. for four hours by using a hot air dryer. Thereafter, the temperature was raised to 300° C. by using an infrared-ray heater. A die for a flat plate having the size of 400 mm×400 mm was set to the temperature of 140° C., and the unidirectional molding material (ii) was heated. Thereafter, five heated molding materials were layered to be introduced into the inside of the die. Next, the molding materials were pressurized at the pressing pressure of 2 MPa for one minute, thereby obtaining the unidirectional carbon fiber reinforced resin shaped product (II).

In addition, when the tensile elastic modulus in the fiber axis direction was divided by the tensile elastic modulus in two directions orthogonal thereto, the value was 13.5.

Manufacture Example B3

The molding material (i) obtained in Manufacture Example B1 as a skin material and the unidirectional molding material (ii) obtained in Manufacture Example B2 as a core material were used. First, the unidirectional molding material (ii) was cut into the size of 30 cm wide×50 cm long, and five unidirectional molding materials (ii) were stacked. Thereafter, the molding materials (i) were pasted on both the surfaces. When performing pasting, soldering iron heated to the temperature of 300° C. was used, and the molding materials were fixed by welding the resin. Each of the thicknesses of the materials, that is, the molding material (i)/the unidirectional molding material (ii)/the molding material (i) were respectively 1.3 mm/0.1 mm/1.3 mm. The materials were heated at the pressure of 2.0 MPa for five minutes in the pressing apparatus heated to the temperature of 300° C., thereby obtaining the shaped product (III) having t=approximately 2.7 mm.

Reference Manufacture Example B1

As the carbon fiber, the carbon fiber "TENAX" (registered trademark) STS40-24KS (the average fiber diameter of 7 μm) (manufactured by TOHO TENAX CO., LTD.) which was cut into the average fiber length of 20 mm was used. As an impregnation aid, Bisphenol A BIS (diphenyl phosphate) (manufactured by DAIHACHI CHEMICAL INDUSTRY CO., LTD.; CR-741) which was aromatic condensed phosphoric acid ester was used. After passing the material through the solution which was emulsified to the non-volatile portion of 12% by mass, the solution which had excessively adhered was removed by a nip rolling. Then, by passing through the hot air drying furnace which was heated to the temperature of 180° C., for two minutes, the material was dried. A carbon fiber bundle to be easily impregnated obtained through the above-referenced treatment was brought along two metal rolls which were heated to the temperature of 200° C. and had the diameters of 60 mm and then, heating treatment was performed again. Accordingly, the impregnated carbon fiber bundle to which the impregnation aid was adhered more uniformly was obtained.

Next, the carbon fiber bundle to be easily impregnated obtained through the above process was coated with polycarbonate (manufactured by TEIJIN LIMITED: L-1225Y) by using a cross head die for electric wire coating having the exit diameter of 3 mm, and the coated carbon fiber bundle was cut into the length of 6 mm, thereby obtaining a molding material which was a core-sheath-type pellet suitable for injection molding, having the carbon fiber fraction of 20% by mass (polycarbonate of 394.7 parts by mass per the carbon fiber of 100 parts by mass), the diameter of 3.2 mm, and the length of 6 mm. The molding material was subjected to injection molding at the cylinder temperatures of C1/C2/C3/C4/N=280° C./290° C./300° C./300° C./300° C. (C1 to C4 were the cavities, and N was the nozzle) at the molding cycle of 35 seconds by using an electric injection molding machine (J110AD) (manufactured by JAPAN STEEL WORKS, LTD., 110 ton), thereby obtaining a dumbbell for tensile test and a shaped product (IV) for a cutting test, having the thickness of 2.6 mm. In the obtained shaped product (IV), no lump or air bubble of a fibrous material caused by poor dispersion was found and the appearance was favorable. The average fiber length of the carbon fibers included in the shaped product (IV) was 0.5 mm.

Reference Manufacture Example B2

Manufacturing of Nylon Shaped Product without Containing Carbon Fibers

The molding material having the thickness of 1.3 mm made from nylon 6 was obtained by using the nylon 6 resin A1030 (manufactured by UNITIKA LTD.) in the pressing apparatus which was heated to the temperature of 260° C. at the pressure of 2.0 MPa for five minutes. The obtained molding material was cut into the size of 400 mm×400 mm, and was dried by using a hot air dryer at the temperature of 120° C. for four hours. Thereafter, the temperature was raised to 300° C. by using an infrared-ray heater. A die for a flat plate having the size of 400 mm×400 mm was set to the temperature of 140° C., and the molding material was heated. Thereafter, two heated molding materials were layered to be introduced into the inside of the die. Next, the molding materials were pressurized at the press pressure of 2 MPa for one minute, thereby obtaining the carbon fiber reinforced resin shaped product (V). The obtained carbon fiber reinforced resin shaped product (V) was cut into the size in accordance with each evaluation.

Example B1

Figure 4B:
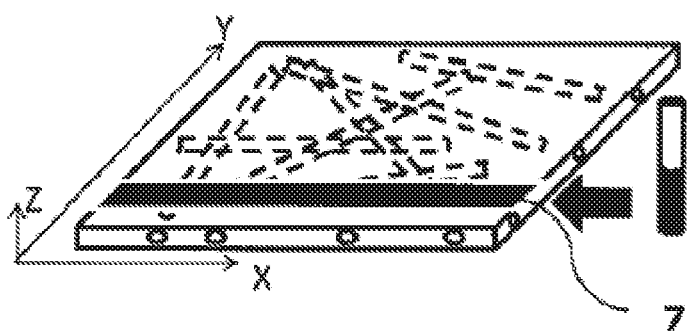
FIG. 4B is a schematic view illustrating an example of a place to be cut in the carbon fiber reinforced resin shaped product in which the carbon fibers are randomly oriented in the in-plane direction.
Figure 4C:
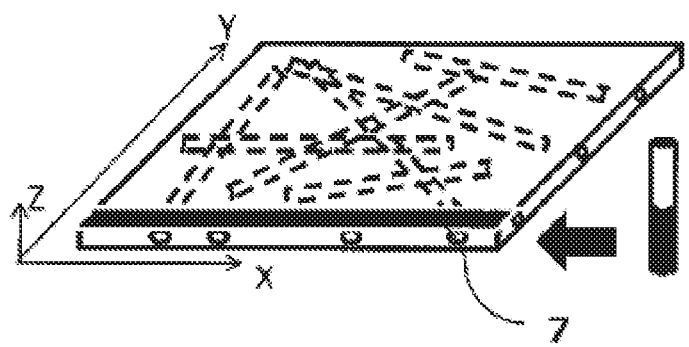
FIG. 4C is a schematic view illustrating an example of a place to be cut in an end portion of the carbon fiber reinforced resin shaped product in which the carbon fibers are randomly oriented in the in-plane direction.

The carbon fiber reinforced resin shaped product (I) was cut as illustrated in FIG. 4B by using the end mill having the helix angle of the spiral cutting blade of 0°, the rake angle of 10°, the number (t) of blades of four, and the diameter of 6 mm. The cut place was approximately 10 cm inside from the end portion of the carbon fiber reinforced resin shaped product. Moreover, since the cut length per unit blade was 0.025 (mm/t) and the rotational frequency was 8,000 (1/min), the feed speed was 800 mm/min.

No burr and separation were generated on the cutting surface (end surface) of the obtained cutting processed product, and it was possible to obtain a favorable cutting processed product (CFRP processed product). The result is shown in Table 2.

Example B2

The cutting processed product was obtained in the same manner as in Example B1 except that the helix angle of the end mill was set to 5°. The result is shown in Table 2.

Example B3

The cutting processed product (CFRP processed product) was obtained in the same manner as in Example B2 except that the rake angle of the end mill was set to 14°. The result is shown in Table 2. It was visually obvious that Rz of the cutting surface (end surface) of the obtained cutting processed product was within a range from 5 μm to 50 μm similar to those in Examples B1 and B2.

Example B4

The cutting processed product was obtained in the same manner as in Example B1 except that the helix angle of the end mill was set to 15°. The result is shown in Table 2.

Example B5

The cutting processed product (CFRP processed product) was obtained in the same manner as in Example B2 except that the carbon fiber reinforced resin shaped product which was a cutting target was replaced with the carbon fiber reinforced resin shaped product (II) and was cut in the direction perpendicular to the orientation direction of the carbon fibers. The result is shown in Table 2. It was visually obvious that Rz of the cutting surface (end surface) of the obtained cutting processed product was within a range from 5 μm to 50 μm similar to those in Examples B1, B2, and B4.

Example B6

The cutting processed product (CFRP processed product) was obtained in the same manner as in Example B5 except that cutting was performed in the cutting direction set to the same direction as the orientation direction of the carbon fibers. The result is shown in Table 2. It was visually obvious that Rz of the cutting surface (end surface) of the obtained cutting processed product was within a range from 5 μm to 50 μm similar to those in Examples B1, B2, and B4.

Example B7

The cutting processed product (CFRP processed product) was obtained in the same manner as in Example B2 except that the carbon fiber reinforced resin shaped product which was a cutting target was replaced with the carbon fiber reinforced resin shaped product (III) and was cut in the direction parallel to the orientation direction of the carbon fibers. The result is shown in Table 2. It was visually obvious that Rz of the cutting surface (end surface) of the obtained cutting processed product was within a range from 5 μm to 50 μm similar to those in Examples B1, B2, and B4.

Reference Example B1

The cutting processed product (CFRP processed product) was obtained in the same manner as in Example B2 except that the carbon fiber reinforced resin shaped product which was a cutting target was replaced with the resin shaped product (IV). The result is shown in Table 2.

Reference Example B2

The cutting processed product (CFRP processed product) was obtained in the same manner as in Example B2 except that the shaped product which was a cutting target was replaced with the resin shaped product (V). The result is shown in Table 2.

Reference Example B3

The cutting processed product (CFRP processed product) was obtained in the same manner as in Reference Example B1 except that the helix angle of the end mill was set to 30°. The result is shown in Table 2.

Reference Example B4

The cutting processed product (CFRP processed product) was obtained in the same manner as in Reference Example B1 except that the helix angle of the end mill was set to 45°. The result is shown in Table 2.

Reference Example B5

The cutting processed product was obtained in the same manner as in Example B1 except that the helix angle of the end mill was set to 30°. The result is shown in Table 2.

Reference Example B6

The cutting processed product was obtained in the same manner as in Example B1 except that the helix angle of the end mill was set to 45°. The result is shown in Table 2.

TABLE 2

| | | Example B1 | Example B2 | Example B3 | Example B4 | Example B5 | Example B6 | Example B7 |
|---|---|---|---|---|---|---|---|---|
| Shaped product | Shaped product | I | I | I | I | II | II | III |
| | Average fiber length of carbon fibers included in shaped product | 20 mm | 20 mm | 20 mm | 20 mm | continuous fibers | continuous fibers | 20 mm/ continuous fibers/20 mm |
| | Thickness mm | 2.6 | 2.6 | 2.6 | 2.6 | 0.1 | 0.1 | 2.7 |
| | Eδ | 1.2 | 1.2 | 1.2 | 1.2 | 13.5 | 13.5 | 1.2 |
| Blade angle | Helix angle [°] | 0 | 5 | 5 | 15 | 5 | 5 | 5 |
| | Rake angle [°] | 10 | 10 | 14 | 10 | 10 | 10 | 10 |
| | Clearance angle [°] | 12 | 12 | 12 | 12 | 12 | 12 | 12 |
| Burr and separation | 5-scale evaluation | 5 | 5 | 5 | 4 | 5 | 5 | 5 |
| | | 1 | 3 | 2 | 4 | 2 | 3 | 2 |
| Life expectancy of blade | | | | | | | | |
| CFRP processed product | Surface roughness Rz [μm] | 6.0 | 10.6 | 5 to 50 | 6.0 | 5 to 50 | 5 to 50 | 5 to 50 |
| Remarks | | | | | | Cut in perpendicular direction with respect to orientation direction of carbon fibers | Cut in parallel direction with respect to orientation direction of carbon fibers | |

TABLE 2-continued

|  |  | Reference Example B1 | Reference Example B2 | Reference Example B3 | Reference Example B4 | Reference Example B5 | Reference Example B6 |
|---|---|---|---|---|---|---|---|
| Shaped product | Shaped product | IV | V | IV | IV | I | I |
|  | Average fiber length of carbon fibers included in shaped product | 0.5 mm | — | 0.5 mm | 0.5 mm | 20 mm | 20 mm |
|  | Thickness mm | 2.6 | 2.6 | 2.6 | 2.6 | 2.6 | 2.6 |
|  | Eδ | 1 | — | 1 | 1 | 1.2 | 1.2 |
| Blade angle | Helix angle [°] | 5 | 5 | 30 | 45 | 30 | 45 |
|  | Rake angle [°] | 10 | 10 | 10 | 10 | 10 | 10 |
|  | Clearance angle [°] | 12 | 12 | 12 | 12 | 12 | 12 |
| Burr and separation | 5-scale evaluation | 5 | 5 | 5 | 5 | 2 | 1 |
| Life expectancy of blade |  | 5 | 5 | 5 | 5 | 5 | 5 |
| Remarks |  |  |  |  |  |  |  |

INDUSTRIAL APPLICABILITY

In a carbon fiber reinforced resin shaped product having an end surface according to the present invention, a surface has excellent surface properties and smoothness and handleability thereof are favorable. Therefore, the end surface does not additionally require a step of removing burrs and a step of performing polishing. Accordingly, the man-hours of additional work can be reduced, and industrial significance thereof is large. In addition, the carbon fiber reinforced resin shaped product having an end surface according to the present invention includes a carbon fiber as a reinforced fiber, thereby being, excellent in mechanical strength and light-weight characteristics. Therefore, for example, the carbon fiber reinforced resin shaped product having an end surface according to the present invention is useful for the purpose of a structure member of an airplane, a structure member of a vehicle such as an automobile, a bonding member which can be used for structure members thereof, and the like.

The present invention has been described in detail with reference to a particular embodiment. However, it is obvious to those skilled in the art that various changes and modifications can be added without departing from the technical scope of the present invention.

The present application is claimed based on Japanese Patent Application No. 2014-090288 filed Apr. 24, 2014 and Japanese Patent Application No. 2014-090287 filed Apr. 24, 2014, the contents of which are incorporated herein by reference.

REFERENCE SIGNS LIST

1: HELIX ANGLE
2: CUTTING DIRECTION
3: RAKE ANGLE
4: CLEARANCE ANGLE
5: CARBON FIBER REINFORCED RESIN SHAPED PRODUCT
6: END MILL
7: CUTTING PLACE
8: CUTTING PROCESSED SURFACE (END SURFACE)
9: BURR GENERATED ON CUTTING SURFACE
10: BLADE
11: CUTTING FORCE ACTING IN Z-AXIS DIRECTION OF FIG. 7
12: ALL CUTTING FORCE OF BLADE APPLIED TO SHAPED PRODUCT
13: CARBON FIBERS RANDOMLY ORIENTED IN-PLANE DIRECTION (XY-DIRECTION OF FIGS. 4A-4C)

The invention claimed is:

1. A carbon fiber reinforced resin processed product having an end surface,
   which has carbon fibers and a thermoplastic resin,
      wherein the carbon fiber reinforced resin processed product is any one of:
         (i) a plate-like object having a side surface as the end surface;
         (ii) a rod-like object having a tip surface as the end surface; or
         (iii) a tube-like object having a tip surface as the end surface,
      wherein the end surface is a cutting processed surface obtained by using a circular saw, a laser, water jet, or an end mill, the cutting processed surface on which removing burrs and re-polishing are not performed and has a surface roughness (Rz) within a range from 5 μm to 12.5 μm,
      wherein the carbon fibers have an average fiber diameter of from 5 μm to 8 μm,
      wherein the carbon fibers are aligned in one direction or are randomly oriented in a two-dimensional direction in the carbon fiber reinforced resin processed product; and
      wherein the end surface has no burrs, separated portions, cracks, or fluffs of carbon fibers.

2. The carbon fiber reinforced resin processed product having an end surface according to claim 1,
   wherein the cutting processed surface is a cut surface.

3. The carbon fiber reinforced resin processed product having an end surface according to claim 1,
   wherein the carbon fibers are discontinuous fibers having an average fiber length of 1 mm or more, and
   wherein the carbon fibers are randomly oriented in two-dimensional directions in the carbon fiber reinforced resin processed product.

4. The carbon fiber reinforced resin processed product having an end surface according to claim 1,
   wherein the carbon fibers are discontinuous fibers having an average fiber length within a range from 1 mm to 100 mm, and
   wherein the carbon fibers are randomly oriented in two-dimensional directions in the carbon fiber reinforced resin processed product.

5. The carbon fiber reinforced resin processed product having an end surface according to claim 1, wherein the carbon fibers are randomly oriented in the two-dimensional direction in the carbon fiber reinforced resin processed product.

6. The carbon fiber reinforced resin processed product having an end surface according to claim 1, wherein the end surface has a height of 30 mm or less.

7. The carbon fiber reinforced resin processed product having an end surface according to claim 1, wherein the carbon fibers included in the carbon fiber reinforced resin processed product has a volume fraction (Vf) of 55% by volume or less.

8. The carbon fiber reinforced resin processed product having an end surface according to claim 1, wherein the end surface has a surface roughness (Rz) within a range from 5 μm to 6.3 μm.

* * * * *